(12) United States Patent
Masuyama et al.

(10) Patent No.: US 7,528,871 B2
(45) Date of Patent: May 5, 2009

(54) IMAGING DEVICE THAT PREVENTS LOSS OF SHADOW DETAIL

(75) Inventors: Masayuki Masuyama, Nagaokakyo (JP); Masashi Murakami, Kyoto (JP); Yoshiyuki Matsunaga, Kamakura (JP)

(73) Assignee: Panasonic Corporation, Osaka (JP)

( * ) Notice: Subject to any disclaimer, the term of this patent is extended or adjusted under 35 U.S.C. 154(b) by 729 days.

(21) Appl. No.: 10/808,615

(22) Filed: Mar. 25, 2004

(65) Prior Publication Data

US 2004/0239786 A1    Dec. 2, 2004

(30) Foreign Application Priority Data

Mar. 25, 2003   (JP)   ............................. 2003-083516

(51) Int. Cl.
    *H04N 5/217*   (2006.01)
(52) U.S. Cl. ...................................... 348/294
(58) Field of Classification Search ............. 348/313, 348/203–310; 257/296; 365/200; 250/208.1
    See application file for complete search history.

(56) References Cited

U.S. PATENT DOCUMENTS

| | | | | |
|---|---|---|---|---|
| 5,327,246 A | * | 7/1994 | Suzuki | ...................... 348/246 |
| 5,504,526 A | * | 4/1996 | Miyagawa et al. | .......... 348/313 |
| 5,625,413 A | * | 4/1997 | Katoh et al. | ................. 348/246 |
| 5,793,423 A | * | 8/1998 | Hamasaki | .................... 348/302 |
| 5,818,526 A | * | 10/1998 | Nomoto | ....................... 348/302 |
| 5,856,686 A | * | 1/1999 | Watanabe et al. | ........... 257/291 |
| 5,920,274 A |  | 7/1999 | Gowda et al. | |
| 5,933,188 A | * | 8/1999 | Shinohara et al. | ........... 348/302 |
| 6,194,696 B1 | * | 2/2001 | Fossum et al. | ........... 250/208.1 |
| 6,423,957 B1 |  | 7/2002 | Kim et al. | |
| 6,525,355 B2 |  | 2/2003 | Furumiya et al. | |
| 6,642,960 B1 | * | 11/2003 | Kohashi et al. | ............. 348/246 |
| 6,683,643 B1 | * | 1/2004 | Takayama et al. | ........... 348/247 |

(Continued)

FOREIGN PATENT DOCUMENTS

EP          0 707 416 A2       4/1996

(Continued)

OTHER PUBLICATIONS

European Search Report, issued in European Patent Application No. 04251668.2-1522, dated on Dec. 28, 2007.

*Primary Examiner*—Tuan V Ho
*Assistant Examiner*—Kent Wang
(74) *Attorney, Agent, or Firm*—McDermott Will & Emery LLP

(57) ABSTRACT

An imaging device outputs brightness information according to an amount of incident light and includes: an imaging unit that includes a plurality of unit cells arranged one dimensionally or two-dimensionally, each unit cell including a photoelectric conversion part that generates a first output voltage in a reset state and a second output voltage according to an amount of incident light, and each unit cell generating a reset voltage that corresponds to the first output voltage and a read voltage that corresponds to the second output voltage; and an output unit operable to output, in relation to each unit cell, brightness information indicating a difference between the reset voltage and the read voltage when normal light is incident to the imaging device and the read voltage is in a predetermined range, and brightness information indicating high brightness when strong light is incident to the imaging device and the read voltage is not in the predetermined range.

20 Claims, 23 Drawing Sheets

U.S. PATENT DOCUMENTS

| | | | | |
|---|---|---|---|---|
| 6,704,050 B1* | 3/2004 | Washkurak et al. | ......... | 348/294 |
| 6,753,914 B1* | 6/2004 | Frost | ......... | 348/246 |
| 6,784,931 B1* | 8/2004 | Kudo | ......... | 348/296 |
| 6,801,253 B1* | 10/2004 | Yonemoto et al. | ......... | 348/241 |
| 7,009,644 B1* | 3/2006 | Sanchez et al. | ......... | 348/247 |
| 7,088,393 B1* | 8/2006 | Park | ......... | 348/294 |
| 7,148,929 B1* | 12/2006 | Mori et al. | ......... | 348/553 |
| 7,263,215 B2* | 8/2007 | Nishio et al. | ......... | 382/149 |
| 2001/0012225 A1* | 8/2001 | Rhodes | ......... | 365/200 |
| 2001/0025969 A1* | 10/2001 | Inui | ......... | 257/225 |
| 2001/0026321 A1* | 10/2001 | Goto | ......... | 348/302 |
| 2001/0033337 A1* | 10/2001 | Sakuragi | ......... | 348/302 |
| 2003/0151686 A1* | 8/2003 | Koyama | ......... | 348/304 |
| 2003/0174226 A1* | 9/2003 | Ahn et al. | ......... | 348/294 |
| 2003/0206234 A1* | 11/2003 | Sakurai et al. | ......... | 348/301 |

FOREIGN PATENT DOCUMENTS

| | | |
|---|---|---|
| EP | 0 777 379 A1 | 6/1997 |
| JP | 61-128681 | 6/1986 |
| JP | 2000-059691 * | 2/2000 |
| JP | 2000-287131 * | 10/2000 |
| JP | 2001-024949 | 1/2001 |
| KR | 2002-0061502 | 7/2002 |
| WO | WO 97/07628 | 2/1997 |
| WO | WO 99/34592 | 7/1999 |
| WO | WO 01/35638 A1 | 5/2001 |

* cited by examiner

IMAGING DEVICE THAT PREVENTS LOSS OF SHADOW DETAIL

BACKGROUND OF THE INVENTION (1) Field of the Invention

The present invention relates to an imaging device formed by one-dimensionally or two-dimensionally arranging on a semiconductor substrate a plurality of unit cells that subject incident light to photoelectric conversion. In particular, the present invention relates to a technique for preventing loss of shadow detail in an image underexposed due to strong incident light.

(2) Related Art

In recent years, such imaging devices as home video cameras and digital still cameras have been popularly widespread.

Theses imaging devices may include an image sensor featuring an amplifier.

Although having advantageous characteristics such as low noise, an image sensor featuring an amplifier suffers from the problem that underexposure occurs due to strong incident light, resulting in loss of shadow detail of an image.

Japanese Laid-Open Patent Application No. 2000-287131 describes an overview of a CMOS image sensor that is an image sensor featuring an amplifier, discusses the problem mentioned above, and discloses a CMOS image sensor that can solve the above problem by detecting, for each pixel sensor, strong incident light based on an output voltage at reset, and replacing the output voltage at reset with another voltage.

According to Japanese Laid-Open Patent Application No. 2000-287131, an output voltage at reset is used to detect a pixel sensor for which shadow detail loss of an image may occur. A change in the output voltage at reset however is a direct cause for shadow detail loss of an image. Even a subtle change in the output voltage at reset directly affects brightness information.

Such a change in an output voltage at reset can be detected only when the change is large enough to be detected. It is therefore impossible to completely eliminate an adverse effect by such a change in an output voltage at reset.

Further, an output voltage at reset changes acutely when strong light is incident. Therefore, accurate detection of such a change is not easy, and thus effectively preventing shadow detail loss of an image is not an easy task.

Assume for example that a photograph of a subject composed of a sufficiently bright middle portion and surrounding peripheral portions that get gradually darker as closer to the edge of the subject is taken by the CMOS image sensor disclosed in Japanese Laid-Open Patent Application No. 2000-287131. In this case, the image sensor can prevent underexposure in the sufficiently bright middle portion, but fails to prevent underexposure in a peripheral portion surrounding the middle portion, so that the peripheral portion surrounding the middle portion appears to be darker than a further peripheral portion closer to the edge. Depending on the degree of underexposure occurring in the peripheral portion appearing darker, this portion may be viewed as a ring-shaped black area in which shadow detail is lost.

SUMMARY OF THE INVENTION

In view of the above problem, the object of the present invention is to provide an imaging device and an imaging method that can effectively prevent loss of shadow detail in an image underexposed due to strong incident light compared with conventional imaging devices, and can ensure elimination of an adverse effect by a change in a voltage at reset.

The object of the present invention can be achieved by an imaging device that outputs brightness information according to an amount of incident light, including: an imaging unit that includes a plurality of unit cells arranged one dimensionally or two-dimensionally, each unit cell including a photoelectric conversion part that generates a first output voltage in a reset state and a second output voltage according to an amount of incident light, and each unit cell generating a reset voltage that corresponds to the first output voltage and a read voltage that corresponds to the second output voltage; and an output unit operable to output, in relation to each unit cell, brightness information indicating a difference between the reset voltage and the read voltage when the read voltage is in a predetermined range, and brightness information indicating high brightness when the read voltage is not in the predetermined range.

The object of the present invention can also be achieved by an imaging method for use in an imaging device that includes an imaging area formed by a plurality of unit cells arranged one dimensionally or two-dimensionally, and outputs brightness information according to an amount of incident light, each unit cell including a photoelectric conversion part that generates a first output voltage in a reset state and a second output voltage according to an amount of incident light, and each unit cell generating a reset voltage corresponding to the first output voltage and a read voltage corresponding to the second output voltage, the method including: a judgment step of judging, in relation to each unit cell, whether the read voltage is in a predetermined range; a first output step of outputting brightness information indicating a difference between the reset voltage and the read voltage when the read voltage is judged to be in the predetermined range; and a second output step of outputting brightness information indicating high brightness when the read voltage is judged not to be in the predetermined range.

According to these, the voltage at reading is used to detect a pixel sensor for which shadow detail loss of an image may occur. This means that a preventive measure against shadow detail loss is taken even for incident light much weaker than such strong light that causes a change in a voltage at reset, which is a direct cause of shadow detail loss, etc.

Accordingly, the imaging device can effectively solve the problem of shadow detail loss in an image underexposed due to strong incident light compared with conventional cases, and can ensure elimination of an adverse effect by a change in a voltage at reset.

In the imaging device, the output unit may include: a first output line that is connected to the imaging unit and receives the reset voltage and the read voltage output from each unit cell; a second output line that is connected to a circuit of a subsequent stage and outputs brightness information to the circuit of the subsequent stage; a clamp capacitance that is connected in series between the first output line and the second output line; and a bypass transistor that is connected in parallel with the clamp capacitance, and brings the first output line and the second output line out of conduction not to bypass the clamp capacitance in a first case where a voltage applied between terminals of the clamp capacitance is in the predetermined range, and brings the first output line and the second output line into conduction to bypass the clamp capacitance in a second case where the voltage applied between the terminals is not in the predetermined range.

According to this construction, when a voltage applied between the terminals of the clamp capacitance is not in the predetermined range, the voltage of the second output line is replaced by the voltage of the first output line without requiring any special operation. The resulting voltage is then output as brightness information. Therefore, the object can be achieved simply by providing one bypass transistor for each output unit.

In the imaging device, the first case may be where an electric potential of the first output line is higher than a barrier potential of the bypass transistor, and the second case may be where the electric potential of the first output line is equal to or smaller than the barrier potential of the bypass transistor.

According to this construction, when the electric potential of the first output line is higher than the barrier potential of the bypass transistor, the voltage of the second output line is replaced by the voltage of the first output line without requiring any special operation. The resulting voltage is then output as brightness information. Therefore, the object can be achieved simply by providing one bypass transistor for each output unit.

In the imaging device, the output unit further may include: a sampling capacitance that is connected in series between the second output line and a terminal for supplying a predetermined voltage; a clamp transistor that is connected in series between the second output line and a terminal for supplying a reference voltage; and a control unit operable to control a reset voltage to be output to the first output line in a state where the clamp transistor is ON and the second output line is set at the reference voltage, and then control a read voltage to be output to the first output line in a state where the clamp transistor is OFF, and wherein when a reset voltage that is in the predetermined range is output to the first output line in a state where the clamp transistor is ON and the second output line is set at the reference voltage, an equivalent to a difference between the reference voltage and the reset voltage may be held by the clamp capacitance, and then when a read voltage that is in the predetermined range is output to the first output line in a state where the clamp transistor is OFF, a voltage of the second output line may change from the reference voltage by an amount corresponding to the equivalent held by the clamp capacitance, so that brightness information indicating a difference between the reset voltage and the read voltage is output, and when a read voltage that is not in the predetermined range is output to the first output line in a state where the clamp transistor is OFF, the bypass transistor may bring the first output line and the second output line into conduction to bypass the clamp capacitance and so the voltage of the second output line is replaced by the read voltage, so that brightness information indicating high brightness is output regardless of whether the reset voltage is in the predetermined range.

In the imaging device, the output unit may further include: a sampling capacitance that is connected in series between the second output line and a terminal for supplying a predetermined voltage; a clamp transistor that is connected in series between the second output line and a terminal for supplying a reference voltage; and a control unit operable to switch the clamp transistor ON in a state where a read voltage is output to the first output line, and then switch the clamp transistor OFF and controls a reset voltage to be output to the first output line, and wherein when the clamp transistor is switched ON in a state where a read voltage that is in the predetermined range is output to the first output line, an equivalent to a difference between the reference voltage and the read voltage may be held by the clamp capacitance, and then the clamp transistor may be switched OFF and a reset voltage that is in the predetermined range is output to the first output line, and a voltage of the second output line may change from the reset voltage by an amount corresponding to the equivalent held by the clamp capacitance, so that brightness information indicating a difference between the reset voltage and the read voltage is output, and the bypass transistor may bring the first output line and the second output line into conduction to bypass the clamp capacitance in a state where a read voltage that is not in the predetermined range is output to the first output line and so no voltage is held by the clamp capacitance, so that brightness information indicating high brightness is output.

According to these, when the read voltage is not in the predetermined range, the voltage of the second output line is replaced by the read voltage. The resulting voltage is then output as brightness information. Therefore, the object can be achieved simply by providing one bypass transistor for each output unit.

In the imaging device, the output unit may further include a voltage supplying unit operable to supply a bias voltage to a gate of the bypass transistor.

According to this construction, dynamic characteristics of the bypass transistor can be adjusted by the bias voltage supplied, depending on individual cases or even after its manufacture. Due to this, high versatility can be realized.

In the imaging device, the bypass transistor may be a depletion-mode transistor.

According to this construction, a bias voltage does not need to be supplied to the bypass transistor. Therefore, the circuit configuration can be simplified.

In the imaging device, each unit cell may include: a light-receiving element operable to generate charge according to an amount of incident light; a charge detecting unit operable to hold the charge generated by the light-receiving element and output the charge as a voltage signal; a reset transistor that is connected in series between a reset terminal for supplying a reference voltage and the charge detecting unit, and when a gate voltage is applied there to, the reset transistor is brought into conduction, so that the charge detecting unit is reset to the reference voltage; and an amplifier transistor that is connected between an amplifier terminal for supplying a reference voltage and the first output line, and when a voltage signal converted by the charge detecting unit is applied to a gate thereof, the voltage signal is amplified and the amplified voltage signal is output to the first output line, and wherein a barrier potential of the bypass transistor may be higher by a predetermined amount than an electric potential of a saturation signal that is an output of the amplifier transistor and that depends on an electric potential of the reset transistor being out of conduction.

According to this construction, when a difference between the barrier potential of the bypass transistor and the electric potential of the saturation signal is larger than a predetermined value, the bypass transistor works, thereby producing an expected effect.

In the imaging device, a difference between the barrier potential of the bypass transistor and the electric potential of the saturation signal may be substantially 0.1V.

According to this construction, a difference between the barrier potential of the bypass transistor and the electric potential of the saturation signal is set at substantially 0.1V.

In the imaging device, the output unit may further include a voltage supplying unit operable to supply a bias voltage to a gate of the bypass transistor, and wherein a difference between the barrier potential of the bypass transistor and the electric potential of the saturation signal may be set by the bias voltage.

According to this construction, a difference between the barrier potential of the bypass transistor and the electric potential of the saturation signal can be set by the bias voltage supplied.

In the imaging device, the bypass transistor and the reset transistor may be manufactured in one process.

According to this construction, the bypass transistor and the reset transistor are manufactured in one process, and accordingly can have similar electric characteristics. The bias voltage to be supplied to each pair of a bypass transistor and a reset transistor manufactured in one process can be made substantially uniform with reduced variations, and therefore, the setting of the bias voltage to be supplied can be made easy.

In the imaging device, the voltage supplying unit may include a bias setting circuit that enables an appropriate bias unique to the imaging device to be set from outside.

According to this construction, the bias voltage can be set from outside. Therefore, the characteristics of imaging devices that often fail to be made uniform can be made uniform.

In the imaging device, the reset transistor may be manufactured by a predetermined process of burying through injection, and the bypass transistor may be manufactured by the predetermined process of burying through injection and an additional injection process, and wherein a difference between the barrier potential of the bypass transistor and the electric potential of the saturation signal may be set by the additional injection process.

According to this construction, a difference between the barrier potential of the bypass transistor and the electric potential of the saturation signal can be set by the additional injection process.

In the imaging device, a first substrate bias voltage may be applied to the bypass transistor, the first substrate bias voltage having an electric potential different from a second substrate bias voltage applied to the reset transistor, and wherein a difference between the barrier potential of the bypass transistor and the electric potential of the saturation signal may be controlled by a difference between the first substrate bias voltage and the second substrate bias voltage.

According to this construction, a difference between the barrier potential of the bypass transistor and the electric potential of the saturation signal can be set by a difference between the substrate bias voltage applied to the bypass transistor and the substrate bias voltage applied to the reset transistor.

In the imaging device, the output unit may further include a clip transistor operable to output, as brightness information indicating high brightness, a voltage matching an input dynamic range of the circuit of the subsequent stage that is an analogue circuit, when a voltage that is a difference between an electric potential of the first output line and an electric potential of the second output line is not in the predetermined range.

According to this construction, a voltage matching the input dynamic range of the analogue circuit of the subsequent stage can be output as brightness information indicating high brightness. Therefore, performance of the analogue circuit can be efficiently utilized.

In the imaging device, the clip transistor may be connected between a terminal for supplying a voltage corresponding to a maximum voltage of the input dynamic range of the circuit of the subsequent stage and the second output line, and when a predetermined voltage is applied to a gate thereof, the clip transistor may be temporarily brought into conduction, so that a voltage matching the input dynamic range is output from the second output line to the circuit of the subsequent stage, and the output unit may further include a clip transistor control unit operable to pulse drive the clip transistor by temporarily bringing the clip transistor into conduction, where a pulse voltage is applied to a gate of the clip transistor when the circuit of the subsequent stage inputs the brightness information.

According to this construction, the clip transistor can be pulse driven, and therefore, power consumption can be made low.

In the imaging device, the output unit may further include; a sampling transistor that is connected in series between the first output line and the clamp capacitance; and a sampling transistor control unit operable to bring the sampling transistor out of conduction in a vertical blanking period during which brightness information is not output from the imaging unit.

According to this construction, the sampling transistor can be brought out of conduction during the vertical blanking period, and so the first output line and the clamp capacitance can be brought out of conduction. Therefore, no charge is held by the clamp capacitance. As a result, brightness information indicating low brightness can be output.

Accordingly, a saturation signal is not output during the vertical blanking period. Therefore, an input dynamic range of an output amplifier of the subsequent stage is not restricted.

In the imaging device, each unit cell may include: an amplifier transistor that is connected in series between an amplifier terminal for supplying a reference voltage and the first output line, and when a voltage signal converted by a charge detecting unit is applied to a gate thereof, the voltage signal is amplified and the amplified voltage signal is output to the first output line; and a select transistor that is connected in series between the amplifier terminal and the amplifier transistor or between the amplifier transistor and the first output line, and the output unit may further include: a load transistor operable to read the output voltage via the amplifier transistor and the select transistor by loading the first output line when the load transistor is in conduction; and a control unit operable to (a) bring a select transistor included in one or more of the unit cells into conduction before bringing the load transistor into conduction, (b) bring the load transistor out of conduction before bringing select transistors included in all the unit cells out of conduction, and (c) bring the load transistor out of conduction during a vertical blanking period during which brightness information is not output from any of the unit cells.

According to this construction, the load transistor can be brought out of conduction during the vertical blanking period. Therefore, no charge is held by the clamp capacitance. As a result, brightness information indicating low brightness can be output.

Accordingly, a saturation signal is not output during the vertical blanking period. Therefore, an input dynamic range of an output amplifier of the subsequent stage is not restricted.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings.

DESCRIPTION OF THE PREFERRED EMBODIMENTS

First Embodiment

Figure 1:
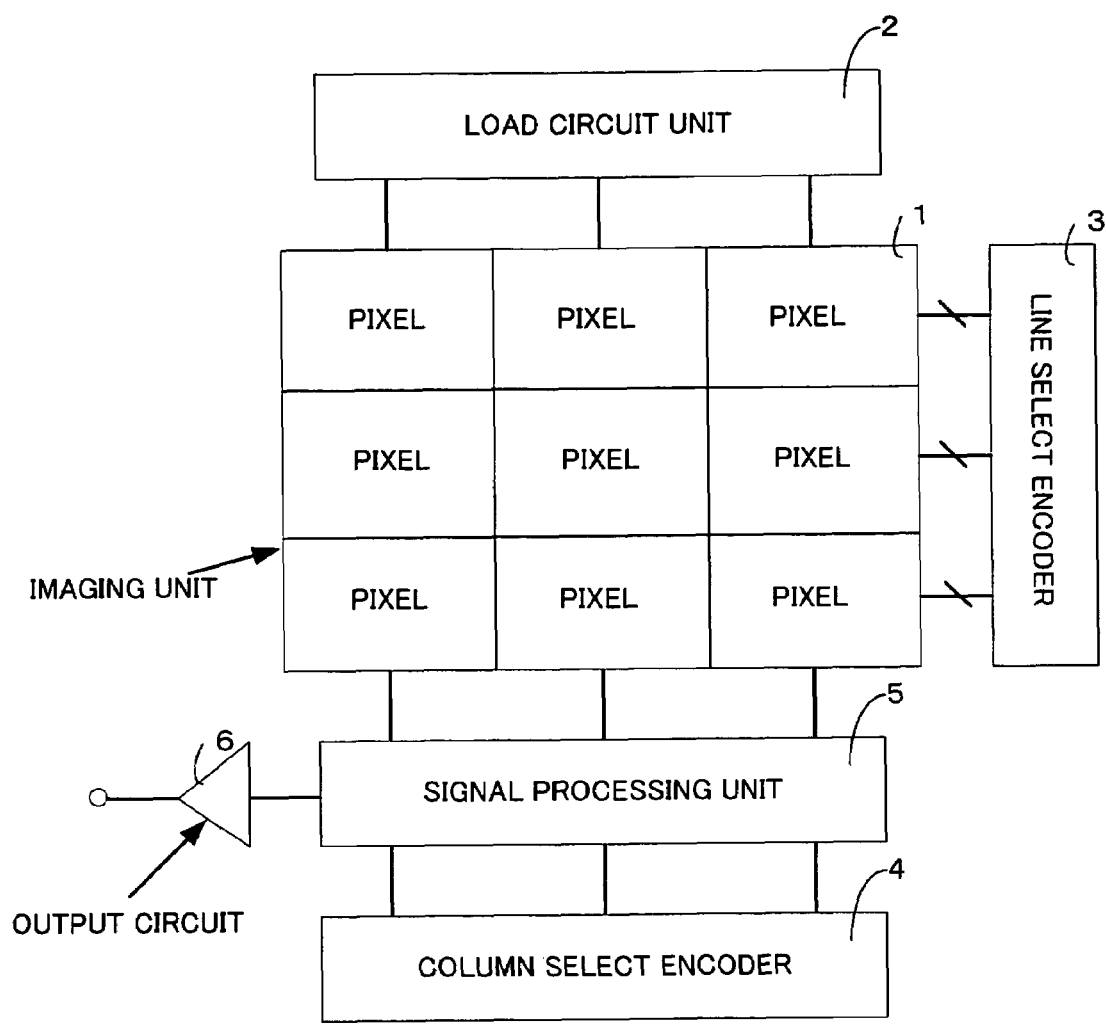
FIG. 1 shows a schematic construction of an imaging device relating to a first embodiment of the present invention.

FIG. 1 shows a schematic construction of an imaging device relating to a first embodiment of the present invention.

As shown in FIG. 1, the imaging device relating to the first embodiment includes an imaging unit 1, a load circuit unit 2, a line select encoder 3, a column select encoder 4, a signal processing unit 5, and an output circuit 6.

The imaging unit 1 is an imaging area formed by one-dimensionally or two-dimensionally arranging a plurality of unit cells. Here, the imaging unit 1 is described as being composed of nine pixels arranged two-dimensionally in a 3×3 matrix for convenience, but is actually composed of about several thousands pixels in the case of one-dimensional arrangement, and about several hundreds of thousands to several millions pixels in the case of two-dimensional arrangement.

The load circuit unit 2 is formed by connecting the same circuits corresponding in one-to-one to columns. The loads circuit 2 loads, in units of columns, the pixels of the imaging unit 1 on every reading of an output voltage.

The line select encoder 3 includes three control lines "RESET", "READ", and "LSEL" corresponding in one-to-one to lines. The line select encoder 3 controls, in units of lines, the pixels of the imaging unit 1 to be reset, read, or selected.

The column select encoder 4 includes control lines, and sequentially selects columns.

The signal processing unit 5 is formed by connecting the same circuits corresponding in one-to-one to columns. The signal processing unit 5 processes outputs made in units of columns from the imaging unit 1, and sequentially outputs the resulting data.

The output circuit 6 subjects outputs of the signal processing unit 5 to necessary conversion, and outputs the resulting data to outside.

Figure 2:
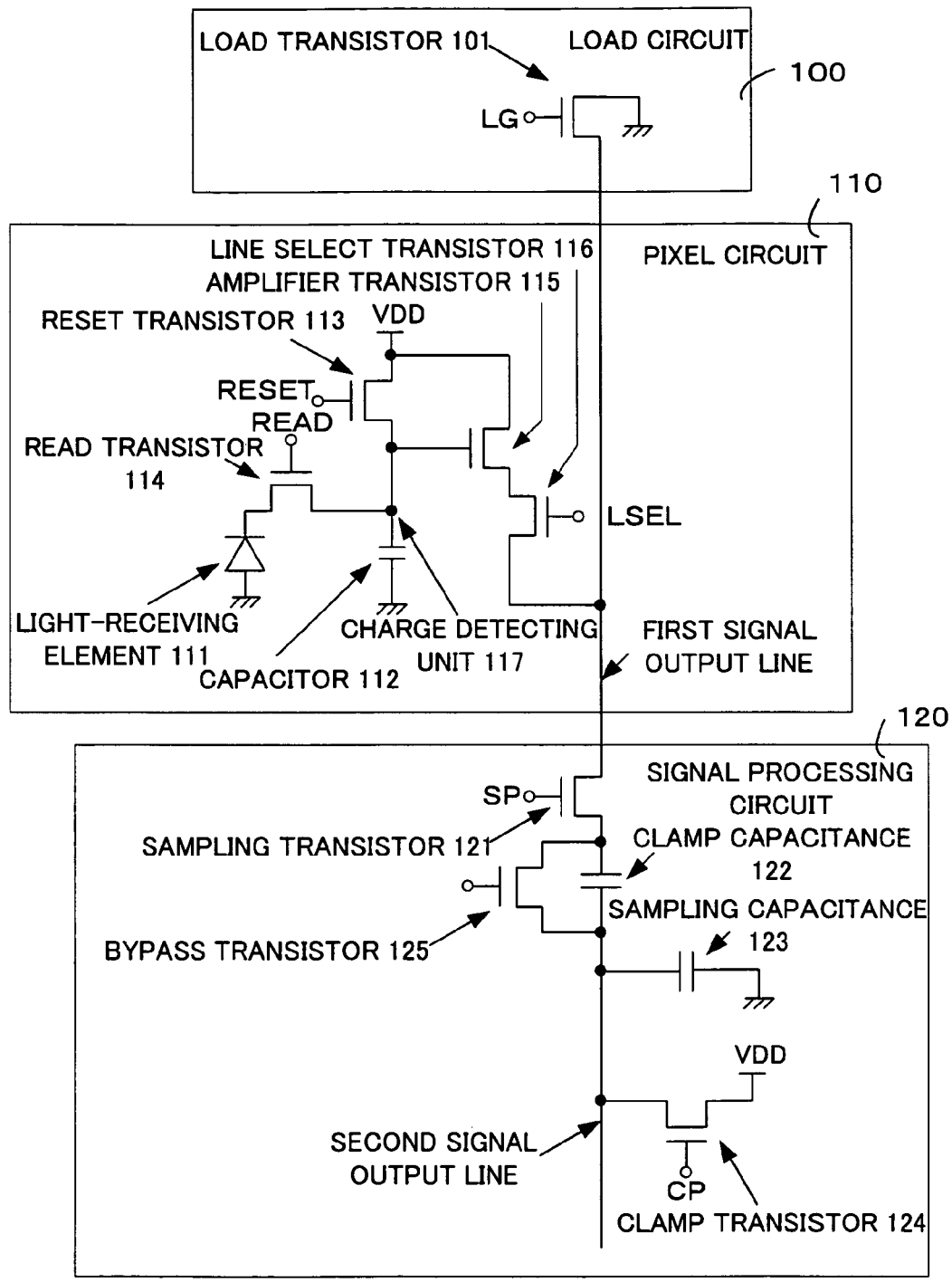
FIG. 2 shows a schematic circuit configuration of the imaging device relating to the first embodiment.

FIG. 2 shows a schematic circuit configuration of the imaging device relating to the first embodiment.

As shown in FIG. 2, the imaging device relating to the first embodiment includes a load circuit 100, a pixel circuit 110, and a signal processing circuit 120.

The load circuit 100 is one of the circuits constituting the load circuit unit 2 shown in FIG. 1. The load circuit 100 includes a load transistor 101 connected between a first signal output line and a GND, and supplies a load voltage (LG).

The pixel circuit 110 is one of the unit cells constituting the imaging unit 1 shown in FIG. 1. The pixel circuit 110 is characterized by outputting a reset voltage obtained by amplifying a voltage at reset and a read voltage obtained by amplifying a voltage at reading, to the first signal output line. The pixel circuit 110 includes a light-receiving element 111 such as a photo diode that subjects incident light to photo electric conversion and outputs charge, a capacitor 112 that accumulates the charge generated by the light-receiving element 111 and outputs the accumulated charge as a voltage signal, a reset transistor 113 that resets a voltage indicated by the capacitor 112 to an initialization voltage (VDD here), a read transistor 114 that supplies the charge output by the light-receiving element 111 to the capacitor 112, an amplifier transistor 115 that outputs a voltage that follows the voltage indicated by the capacitor 112, and a line select transistor 116 that outputs an output of the amplifier transistor 115 to the first signal output line upon receipt of a line select signal from the line select encoder 3. In this specification, for ease of explanation, a point in the capacitor 112 indicating a voltage determined according to the accumulated charge of the capacitor 112, and where the reset transistor 113, the read transistor 114, and the amplifier transistor 115 are connected is hereafter referred to as a charge detecting unit 117.

The signal processing circuit 120 is one of the circuits constituting the signal processing unit 5 shown in FIG. 1. The signal processing circuit 120 is characterized by outputting brightness information indicating a difference between a reset voltage output from the unit cell and a read voltage when the read voltage is in a predetermined range, and outputting brightness information indicating high brightness when the read voltage is not in the predetermined range. The signal processing circuit 120 includes a sampling transistor 121 and a clamp capacitance 122 connected in series between the first signal output line and the second signal output line, a sampling capacitance 123 connected in series between the second signal output line and the GND, a clamp transistor 124 connected in series between the second signal output line and a reference voltage terminal VDD, and a bypass transistor 125 that is connected in parallel with the clamp capacitance 122 and that brings the first signal output line and the second signal output line out of conduction not to bypass the clamp capacitance 122 when a voltage applied between the terminals of the clamp capacitance 122 does not exceed the predetermined voltage, and brings the first signal output line and the second signal output line into conduction to bypass the clamp capacitance 122 when the voltage exceeds the predetermined voltage.

Here, to the pixel circuit 110, a reset pulse (initialization signal: RESET), a read pulse (READ), a line select signal (LSEL) are supplied at predetermined timings, and to the signal processing circuit 120, a sampling pulse (SP) and a clamp pulse (CP) are supplied at predetermined timings. Transistors corresponding to these control pulses are switched ON and OFF.

Figure 3:
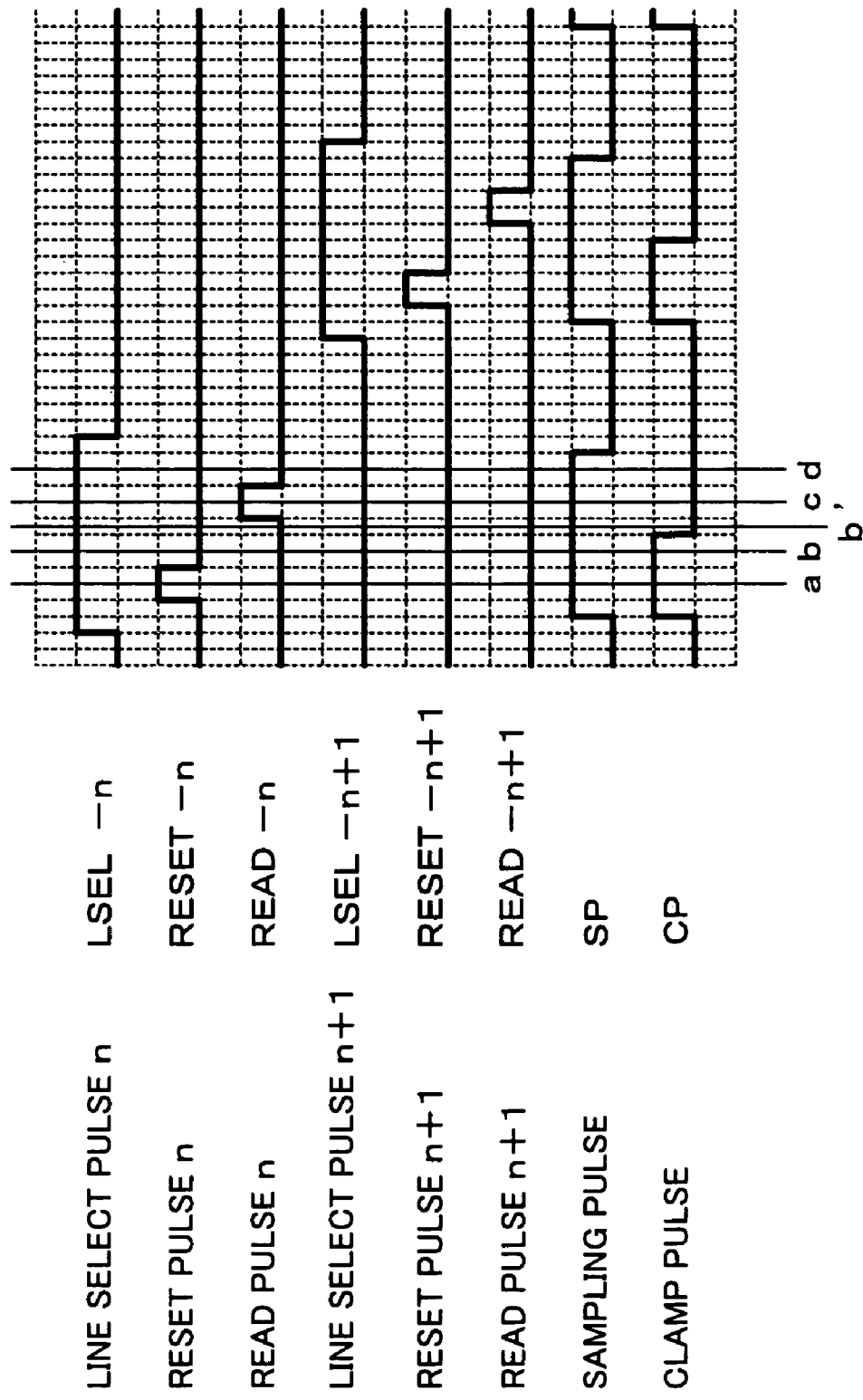
FIG. 3 shows the timings of various control pulses supplied in the imaging device relating to the first embodiment.

FIG. 3 shows the timings of various control pulses supplied in the imaging device relating to the first embodiment.

By supplying the control pulses at the timings shown in FIG. 3, the clamp transistor 124 can be switched ON with the line select transistor 116 being ON, and the reset voltage can be output to the first signal output line with the second signal output line being set at a reference voltage ("a" in FIG. 3). Here, when the reset voltage is in a predetermined range, an equivalent to a difference between the reference voltage and the reset voltage is held by the clamp capacitance 122 ("b" in FIG. 3). After this, the read voltage is output to the first signal output line with the clamp transistor 124 being OFF ("c" in FIG. 3). Here, when the read voltage is in a predetermined range, the voltage of the second signal output line changes from the reference voltage by an amount equivalent to a difference between the reset voltage and the read voltage ("d" in FIG. 3). The resulting voltage can then be output as brightness information. When the read voltage is not in a predetermined range, the bypass transistor 125 brings the first signal output line and the second signal output line into conduction to bypass the clamp capacitance 122, so that the voltage of the second signal output line is replaced by the read voltage. The resulting voltage can then be output as brightness information.

Here, the predetermined voltage range may be set by incorporating a depletion-mode transistor as the bypass transistor 125 during the manufacture, or by supplying, with the use of voltage supplying means, a bias voltage constantly or at necessary timings ("c" to "d" in FIG. 3 etc.) to the gate of the bypass transistor 125.

As one example, the bias voltage may be output, in the form of pulses, to the gate of the bypass transistor 125 during when the read voltage is being read from the pixel circuit 110.

<Operations>

FIGS. 4A to 4D each show the state of electric potential in each area of the pixel circuit 110 at each timing in the case where such strong light that causes underexposure or loss of shadow detail of an image is not incident (hereafter referred to as the "normal case").

FIGS. 4A to 4D respectively correspond to the timings "a" to "d" in FIG. 3.

Figure 5:
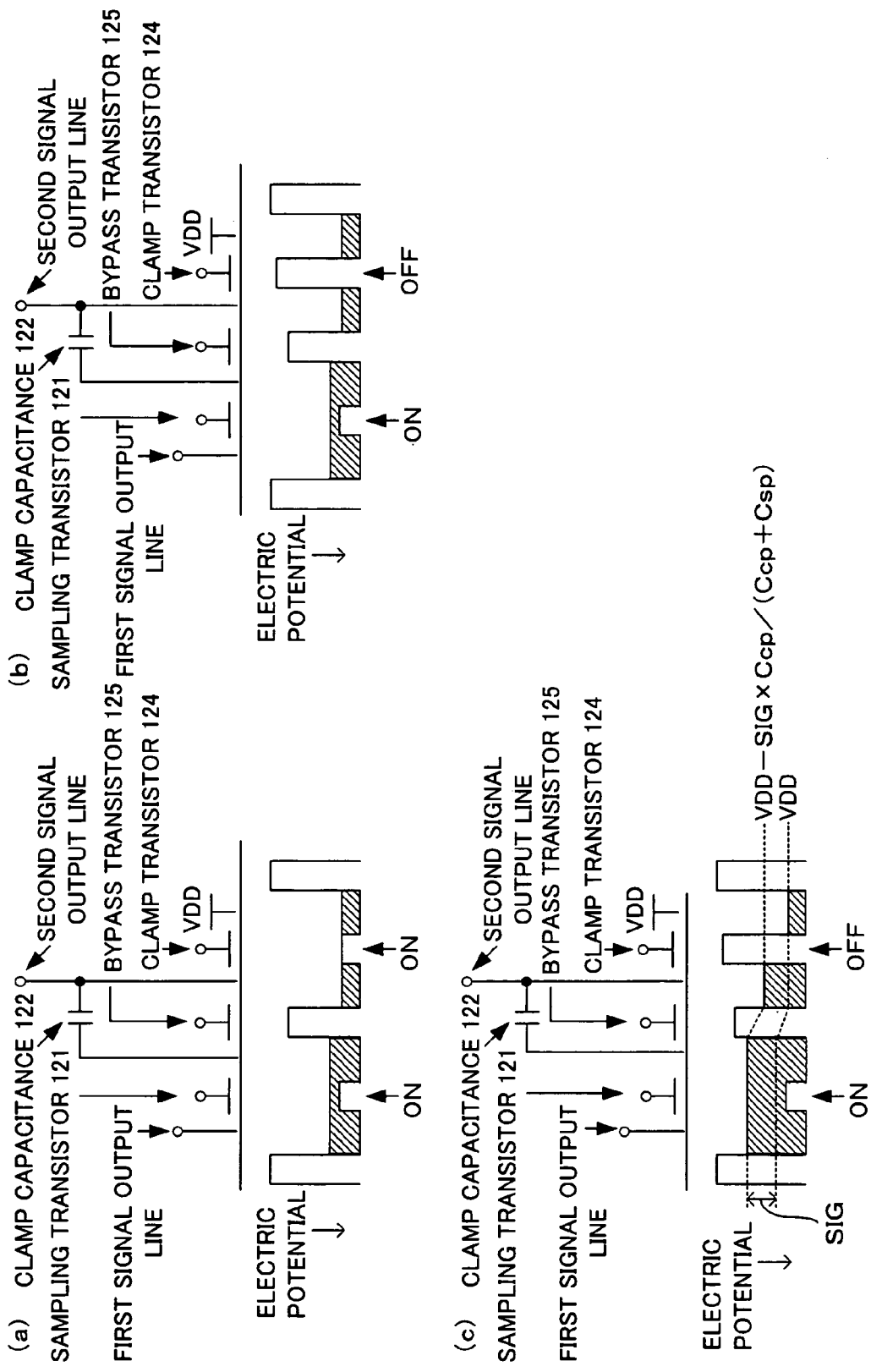
FIG. 5A shows the state of electric potential in each area of a signal processing circuit 120 at the timing "b" in FIG. 3 in the normal case.
FIG. 5B shows the state of electric potential in each area of the signal processing circuit 120 at the timing "b'" in FIG. 3 in the normal case.
FIG. 5C shows the state of electric potential in each area of the signal processing circuit 120 at the timing "d" in FIG. 3 in the normal case.

FIG. 5A shows the state of electric potential in each area of the signal processing circuit 120 at the timing "b" in FIG. 3.

FIG. 5B shows the state of electric potential in each area of the signal processing circuit 120 at the timing "b'" in FIG. 3.

FIG. 5C shows the state of electric potential in each area of the signal processing circuit 120 at the timing "d" in FIG. 3.

Here, FIGS. 4A to 4D and FIGS. 5A to 5C each show in its upper half a schematic circuit construction and in its lower half the state of electric potential in the areas corresponding to the positions in the circuit shown in the upper half.

The following describes the change of electric potential in each area of the pixel circuit 110 and the change of electric potential in each area of the signal processing circuit 120, with reference to FIGS. 4A to 4D and FIGS. 5A to 5C.

Figure 4:
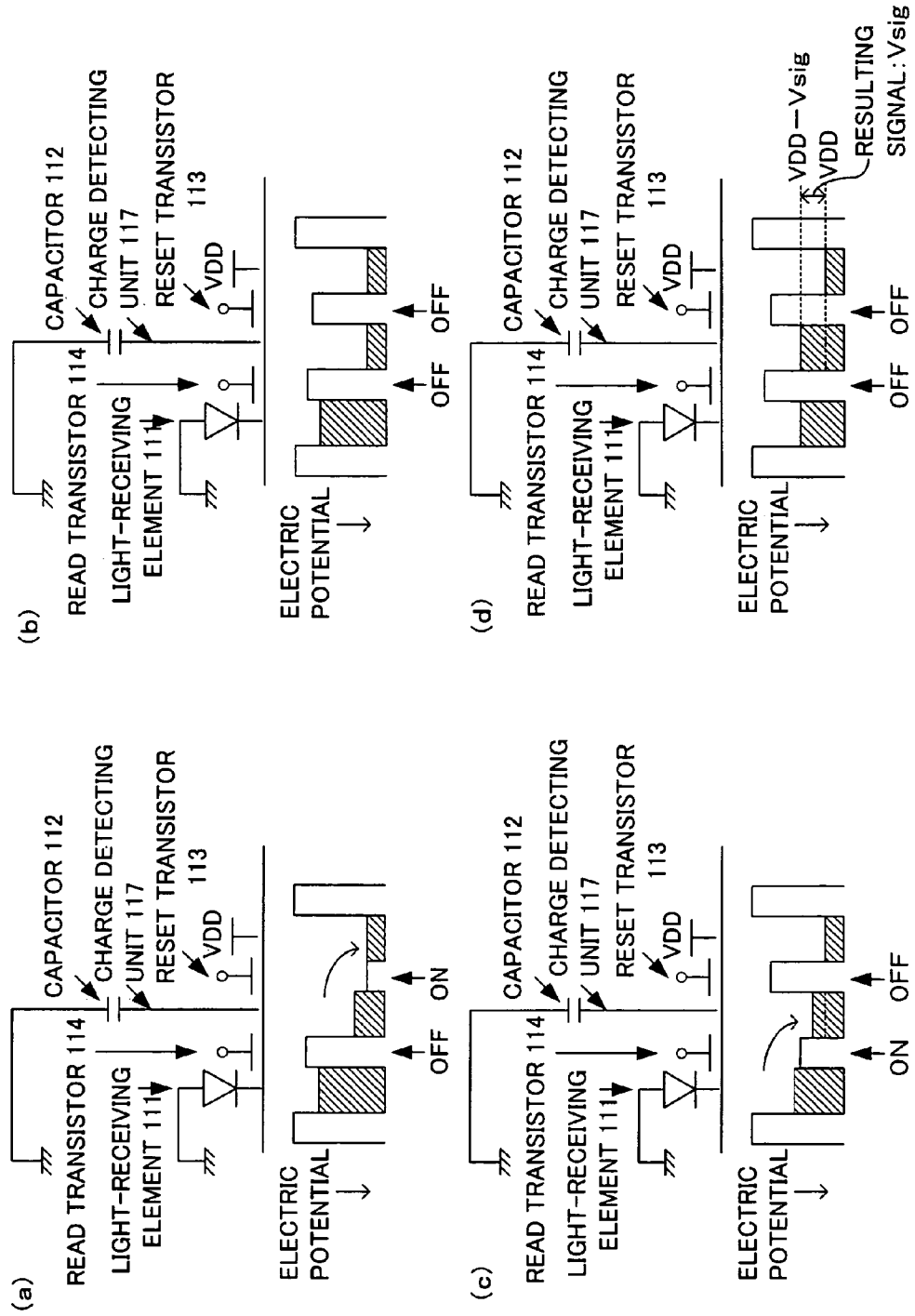
FIGS. 4A to 4D each show the state of electric potential in each area of a pixel circuit 110 at each timing in the normal case.

(1) At the timing "a" in FIG. 3, the read transistor 114 is OFF and the reset transistor 113 is ON. Therefore, as shown in FIG. 4A, the charge generated in the light-receiving element 111 is not transferred to the charge detecting unit 117, and the charge of the charge detecting unit 117 is transferred to the VDD terminal.

(2) At the timing "b" in FIG. 3, the reset transistor 113 is switched from ON to OFF. As shown in FIG. 4B, the voltage of the charge detecting unit 117 is reset to the VDD. Also, as shown in FIG. 5A, because the clamp transistor 124 is ON, the voltage of the second signal output line is reset to the VDD.

(3) At the timing "b'" in FIG. 3, the clamp transistor 124 is switched from ON to OFF. As shown in FIG. 5B, an equivalent to a difference between the reset voltage and the VDD is held by the clamp capacitance 122.

(4) At the timing "c" in FIG. 3, the read transistor 114 is switched ON, with the reset transistor 113 being OFF. Therefore, as shown in FIG. 4C, the charge generated in the light-receiving element 111 is transferred to the charge detecting unit 117.

(5) At the timing "d" in FIG. 3, as shown in FIG. 4D, the read transistor 114 is switched OFF, with the reset transistor 113 being OFF. Therefore, the charge generated in the light-receiving element 111 is read to the charge detecting unit 117.

Here, the voltage of the charge detecting unit 117 changes, and the resulting voltage is amplified by the amplifier transistor 115. Therefore, the voltage of the first signal output line changes to the read voltage. Also, because the equivalent to the difference between the reset voltage and the VDD is held by the clamp capacitance 122, the voltage of the second signal output line becomes a voltage obtained by subtracting the voltage change of the first signal output line from the VDD as shown in FIG. 5C. The resulting voltage is then output as brightness information (assuming the voltage change of the first signal output as SIG, the clamp capacitance 122 as Ccp, and the sampling capacitance 123 as Csp, the voltage of the second signal output line is VDD−SIG×Ccp/(Ccp+Csp)).

FIGS. 6A to 6D and FIG. 7 each show the state of electric potential in each area of the pixel circuit 110 at each timing in the case where such strong light that causes underexposure or loss of shadow detail of an image is incident (hereafter referred to as the "high brightness case").

Figure 6:
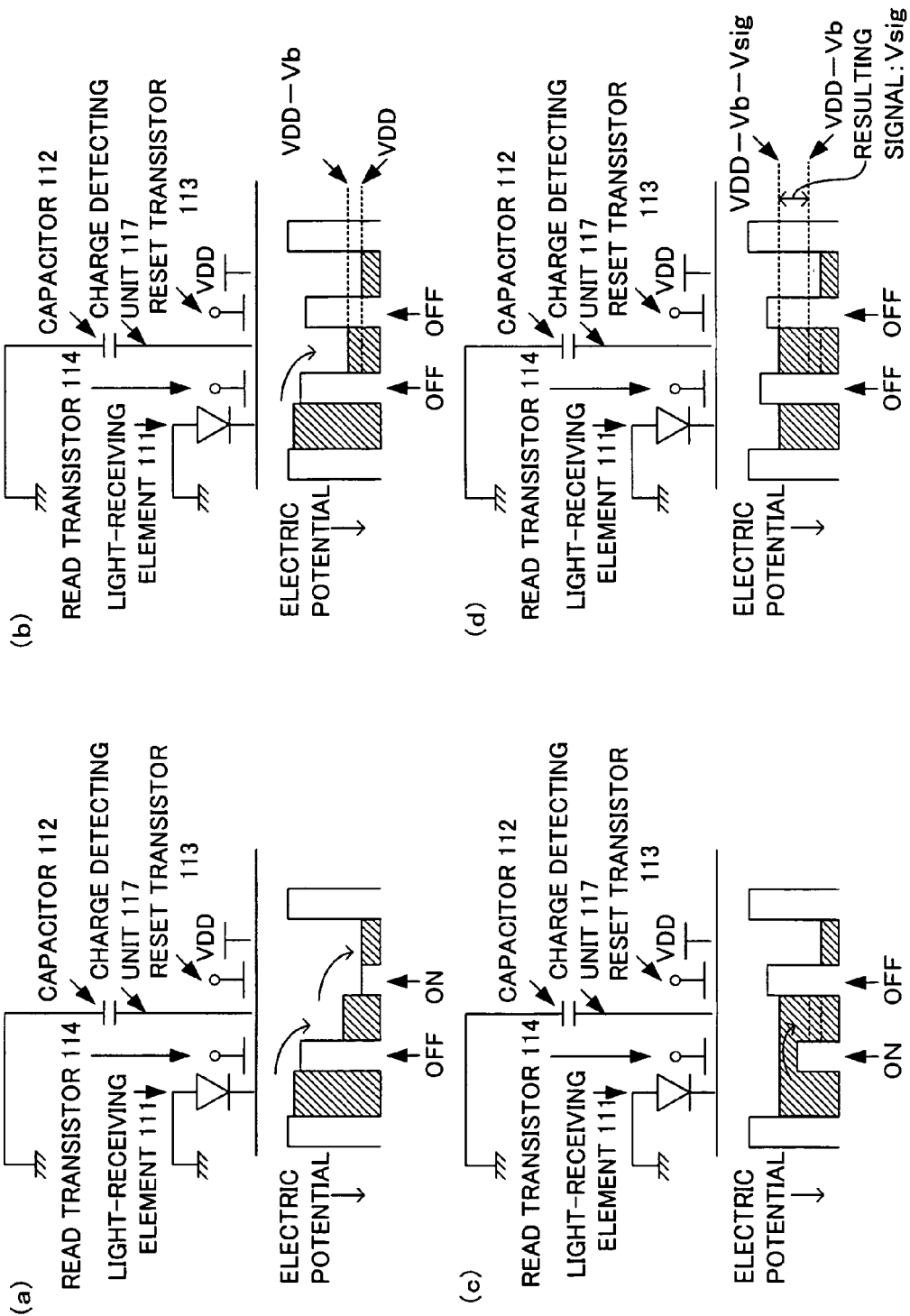
FIGS. 6A to 6D, and FIG. 7 each show the state of electric potential in each area of the pixel circuit 110 at each timing in the high brightness case.
Figure 7:
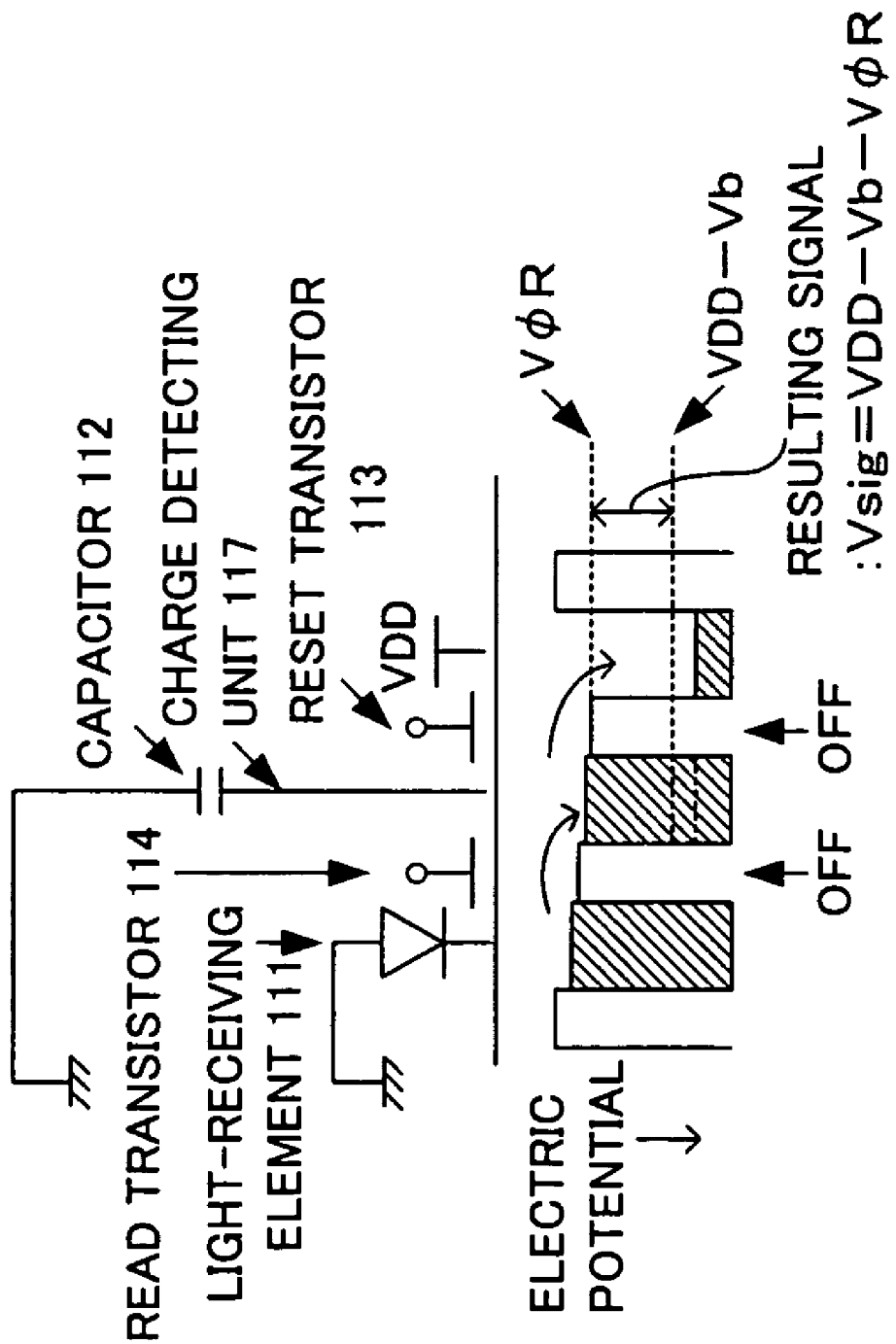

Here, FIGS. 6A to 6D respectively correspond to the timings shown in FIGS. 3A to 3D. FIG. 7 shows the case where stronger light is incident at the timing "d" in FIG. 3 than light incident in the case of FIG. 6D, or corresponds to a timing later than the timing "d" in FIG. 3. In the state shown in FIG. 7, loss of shadow detail occurs if no preventive measures are taken.

In this specification, the case where the charge of the first signal output line is not as high as to exceed the barrier potential of the bypass transistor 125 at the timing "b" in FIG. 3 in the high brightness case is specifically referred to as the "first high-brightness case", and the case where the charge of the first signal output line is as high as to exceed the barrier potential of the bypass transistor 125 at the timing "b" in FIG. 3 in the high brightness case is specifically referred to as the "second high-brightness case".

Figure 8:
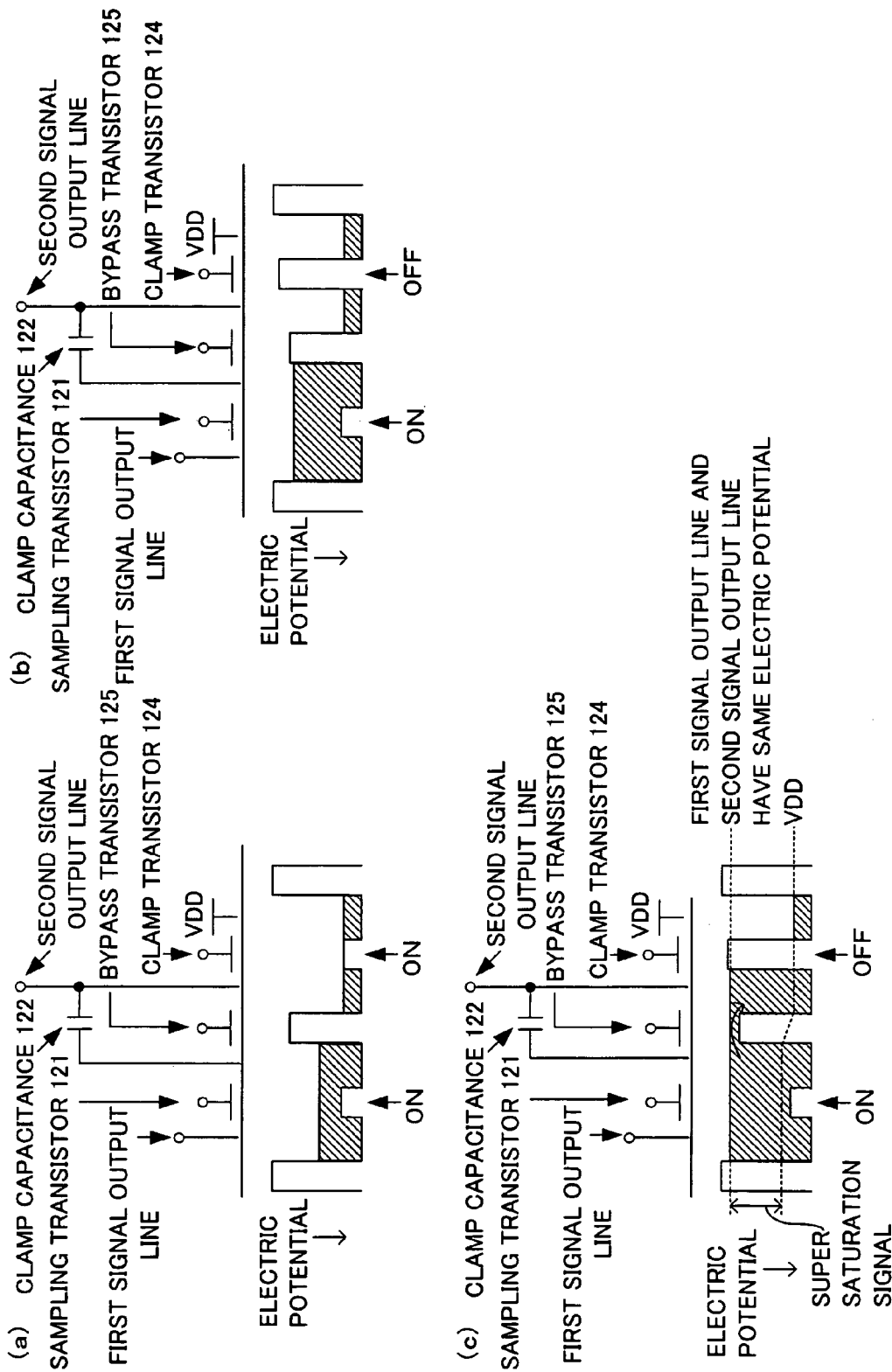
FIG. 8A shows the state of electric potential in each area of the signal processing circuit 120 at the timing "b" in FIG. 3 in the first high-brightness case.
FIG. 8B shows the state of electric potential in each area of the signal processing circuit 120 at the timing "b'" in FIG. 3 in the first high-brightness case.
FIG. 8C shows the state of electric potential in each area of the signal processing circuit 120 at the timing "d" in FIG. 3 in the first high-brightness case.

FIG. 8A shows the state of electric potential in each area of the signal processing circuit 120 at the timing "b" in FIG. 3 in the first high-brightness case.

FIG. 8B shows the state of electric potential in each area of the signal processing circuit 120 at the timing "b'" in FIG. 3 in the first high-brightness case.

FIG. 8C shows the state of electric potential in each area of the signal processing circuit 120 at the timing "d" in FIG. 3 in the first high-brightness case.

Figure 9:
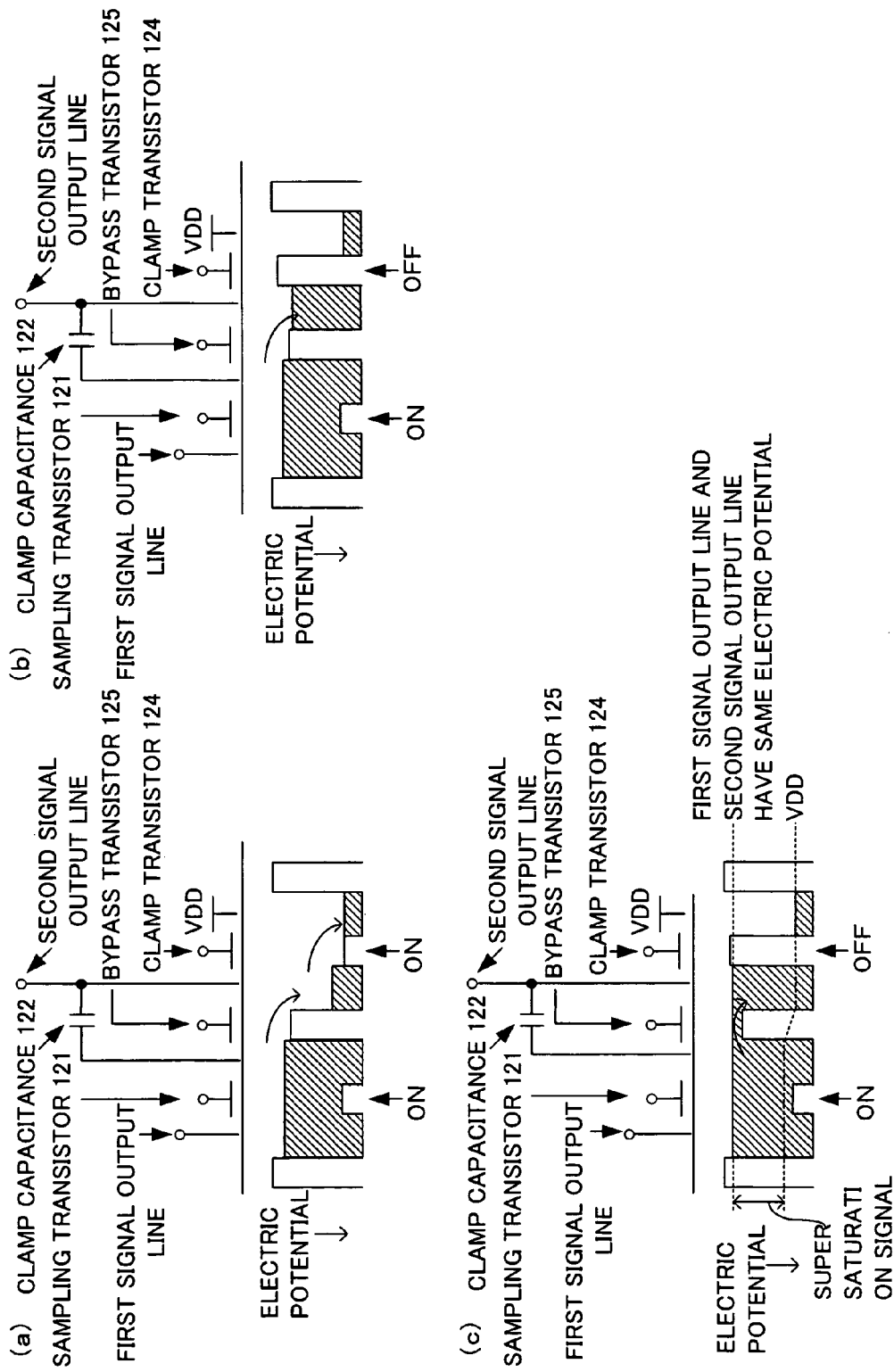
FIG. 9A shows the state of electric potential in each area of the signal processing circuit 120 at the timing "b" in FIG. 3 in the second high-brightness case.
FIG. 9B shows the state of electric potential in each area of the signal processing circuit 120 at the timing "b'" in FIG. 3 in the second high-brightness case.
FIG. 9C shows the state of electric potential in each area of the signal processing circuit 120 at the timing "d" in FIG. 3 in the second high-brightness case.

FIG. 9A shows the state of electric potential in each area of the signal processing circuit 120 at the timing "b" in FIG. 3 in the second high-brightness case.

FIG. 9B shows the state of electric potential in each area of the signal processing circuit 120 at the timing "b'" in FIG. 3 in the second high-brightness case.

FIG. 9C shows the state of electric potential in each area of the signal processing circuit 120 at the timing "d" in FIG. 3 in the second high-brightness case.

Here, FIGS. 6A to 6D, FIG. 7, FIGS. 8A to 8C, and FIGS. 9A to 9C each show in its upper half a schematic circuit construction and in its lower half the state of electric potential in the areas corresponding to the positions in the circuit shown in the upper half.

The following describes the change of electric potential in each area of the pixel circuit 110 and the change of electric potential in each area of the signal processing circuit 120, with reference to FIGS. 6A to 6D, FIG. 7, FIGS. 8A to 8C, and FIGS. 9A to 9C.

(1) At the timing "a" in FIG. 3, the read transistor 114 is OFF and the reset transistor 113 is ON. Therefore, in the normal case, the charge generated in the light-receiving element 111 is not transferred to the charge detecting unit 117. In the first and second high-brightness cases as shown in FIG. 6A, however, the charge generated in the light-receiving element 111 exceeds the barrier potential of the read transistor 114, and is transferred to the charge detecting unit 117, and at the same time, the charge of the charge detecting unit 117 is transferred to the VDD terminal.

(2) At the timing "b" in FIG. 3, the reset transistor 113 is switched from ON to OFF. As shown in FIG. 6B, however, the charge generated in the light-receiving element 111 then exceeds the barrier potential of the read transistor 114 and is transferred to the charge detecting unit 117. Therefore, the voltage of the charge detecting unit 117 becomes lower than the VDD. The clamp transistor 124 is ON at this time. Therefore, in the first high-brightness case as shown in FIG. 8A, the voltage of the second signal output line is reset to the VDD and the charge of the first signal output line does not exceed the barrier potential of the bypass transistor 125, and in the second high-brightness case as shown in FIG. 9A, the voltage of the second signal output line is reset to the VDD but at the same time the charge of the first signal output line exceeds the barrier potential of the bypass transistor 125 and is transferred to the second signal output line.

(3) At the timing "b'" in FIG. 3, the clamp transistor 124 is switched from ON to OFF. In the normal case, an equivalent to a difference between the reset voltage and the VDD is held by the clamp capacitance 122 with the voltage of the second signal output line being reset to the VDD. In the first high-brightness case as shown in FIG. 8B, however, an equivalent to a difference between the reset voltage and the VDD, which is smaller than that in the normal case, is held by the clamp capacitance 122, and in the second high-brightness case as shown in FIG. 9B, the charge of the first signal output line exceeds the barrier potential of the bypass transistor 125 and is transferred to the second signal output line, and substantially zero voltage difference is held by the clamp capacitance 122.

At the timings "b" and "b'" in FIG. 3, in the second high-brightness case, the charge of the first signal output line exceeds the barrier potential of the bypass transistor 125 and is transferred to the second signal output line, and substantially zero voltage difference is held by the clamp capacitance 122. In this case, too, the resulting output becomes the same, and therefore subsequent operations are important.

(4) At the timing "c" in FIG. 3, the read transistor 114 is switched ON, with the reset transistor 113 being OFF. As shown in FIG. 6C, therefore, the charge generated in the light-receiving element 111 is transferred to the charge detecting unit 117.

(5) At the timing "d" in FIG. 3, as shown in FIG. 6D, the read transistor 114 is switched OFF, with the reset transistor 113 being OFF. Therefore, the charge generated in the light-receiving element 111 is read to the charge detecting unit 117.

Here, the voltage of the charge detecting unit 117 changes and the resulting voltage is amplified by the amplifier transistor 115, and therefore the voltage of the first signal output line changes to the read voltage. In the normal case, an equivalent to a difference between the reset voltage and the VDD is held by the clamp capacitance 122. Therefore, the voltage of the second signal output line becomes a voltage obtained by subtracting the voltage change of the first signal output line from the VDD. The resulting voltage is then output as brightness information. In the first and second high-brightness cases, however, as shown in FIGS. 8C and 9C respectively, the charge of the first signal output line exceeds the barrier potential of the bypass transistor 125 and is transferred to the second signal output line, and the voltage of the second signal output line becomes an equivalent to the voltage of the first signal output line, indicating high brightness. The resulting voltage is then output as brightness information.

<Conclusions>

Figure 10:
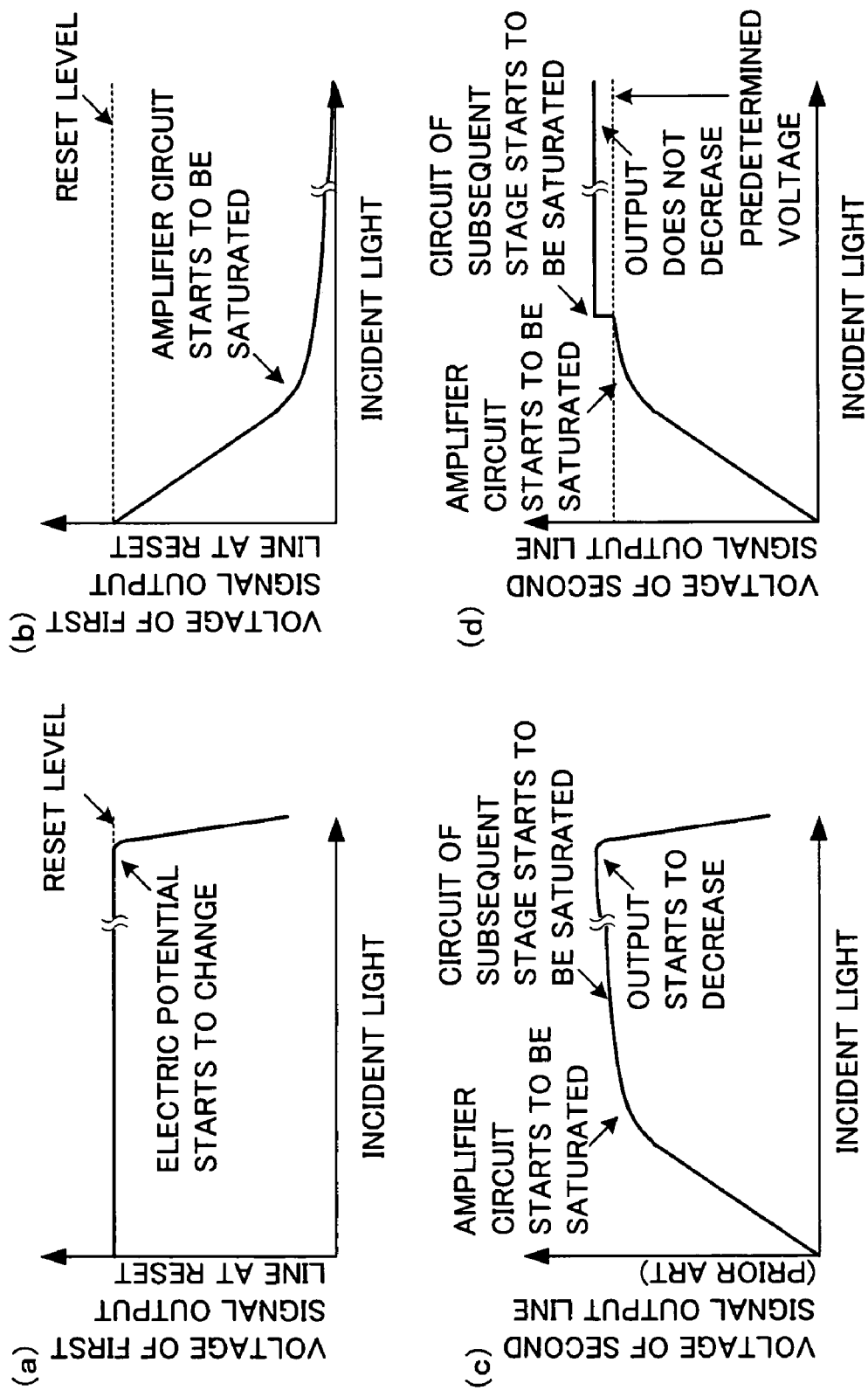
FIG. 10A shows characteristics of a voltage of a first signal output line at reset.
FIG. 10B shows characteristics of a voltage of the first signal output line at reading.
FIG. 10C shows characteristics of an output voltage of a conventional imaging device without any measures taken to prevent underexposure or shadow detail loss of an image, corresponding to FIGS 10A and 10B.
FIG. 10D shows characteristics of an output voltage of the imaging device relating to the first embodiment.

FIG. 10A shows characteristics of the voltage of the first signal output line at reset.

FIG. 10B shows characteristics of the voltage of the first signal output line at reading.

FIG. 10C shows characteristics of the output voltage of a conventional imaging device without any measures taken to prevent underexposure or shadow detail loss of an image, corresponding to FIGS 10A and 10B.

FIG. 10D shows characteristics of the output voltage of the imaging device relating to the first embodiment. In this imaging device relating to the first embodiment, an output voltage exceeding a predetermined voltage is replaced by a voltage indicating high brightness. Therefore, underexposure or shadow detail loss of an image can be completely prevented.

Here, in FIGS. 10A to 10D, the horizontal axis indicates strength of incident light (being stronger toward right), and the vertical axis indicates a voltage (being more positive toward top in FIGS. 10A and 10B, and being more negative toward top in FIGS. 10C and 10D).

As described above, the first embodiment of the present invention focuses on the voltage at reading shown in FIG. 10B. When the voltage at reading reaches a voltage in such a range that causes the amplifier circuit to be saturated, the bypass transistor directly replaces its output voltage by a voltage indicating high brightness. In this way, the first embodiment can effectively solve the problem of underexposure or shadow detail loss of an image compared with conventional cases, by taking a preventive measure even for incident light much weaker than such incident light that causes underexposure or shadow detail loss of an image. Also, the first embodiment can ensure elimination of an adverse effect by a change in a voltage at reset.

Second Embodiment

<Construction>

Figure 11:
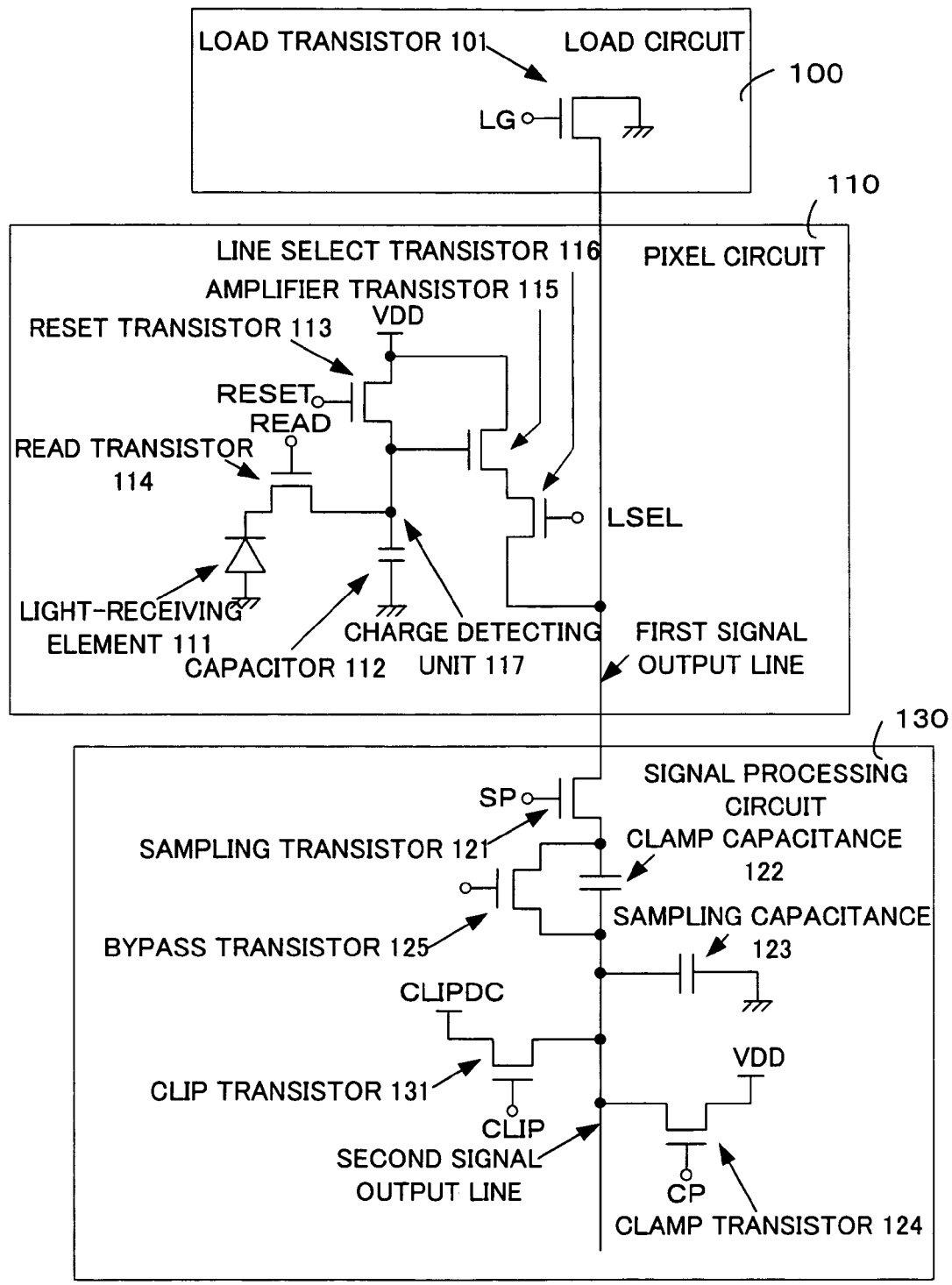
FIG. 11 shows a schematic circuit configuration of an imaging device relating to a second embodiment of the present invention.

FIG. 11 shows a schematic circuit configuration of an imaging device relating to a second embodiment of the present invention.

The imaging device relating to the second embodiment includes, instead of the signal processing circuit 120 in the first embodiment, a signal processing circuit 130 that additionally includes a clip transistor 131 connected in series between the second signal output line and a clip voltage terminal (CLIPDC), to prevent the voltage of the second signal output line from increasing to such a voltage that exceeds an input dynamic range of an output amplifier of the subsequent stage.

The imaging device relating to the second embodiment can regulate, with the use of the additionally provided clip transistor 131, the voltage of the second signal output line so as not to be below a predetermined voltage.

Here, as a method for driving the clip transistor 131, the DC drive of applying a fixed voltage and the pulse drive of applying a clip pulse (CLIP) at appropriate timings may be used.

The timings of the control pulses of various types supplied when the clip transistor 131 is DC driven are the same as the timings shown in FIG. 3 in the first embodiment.

The following describes the timings of the control pulses of various types supplied when the clip transistor 131 is pulse driven.

Figure 12:
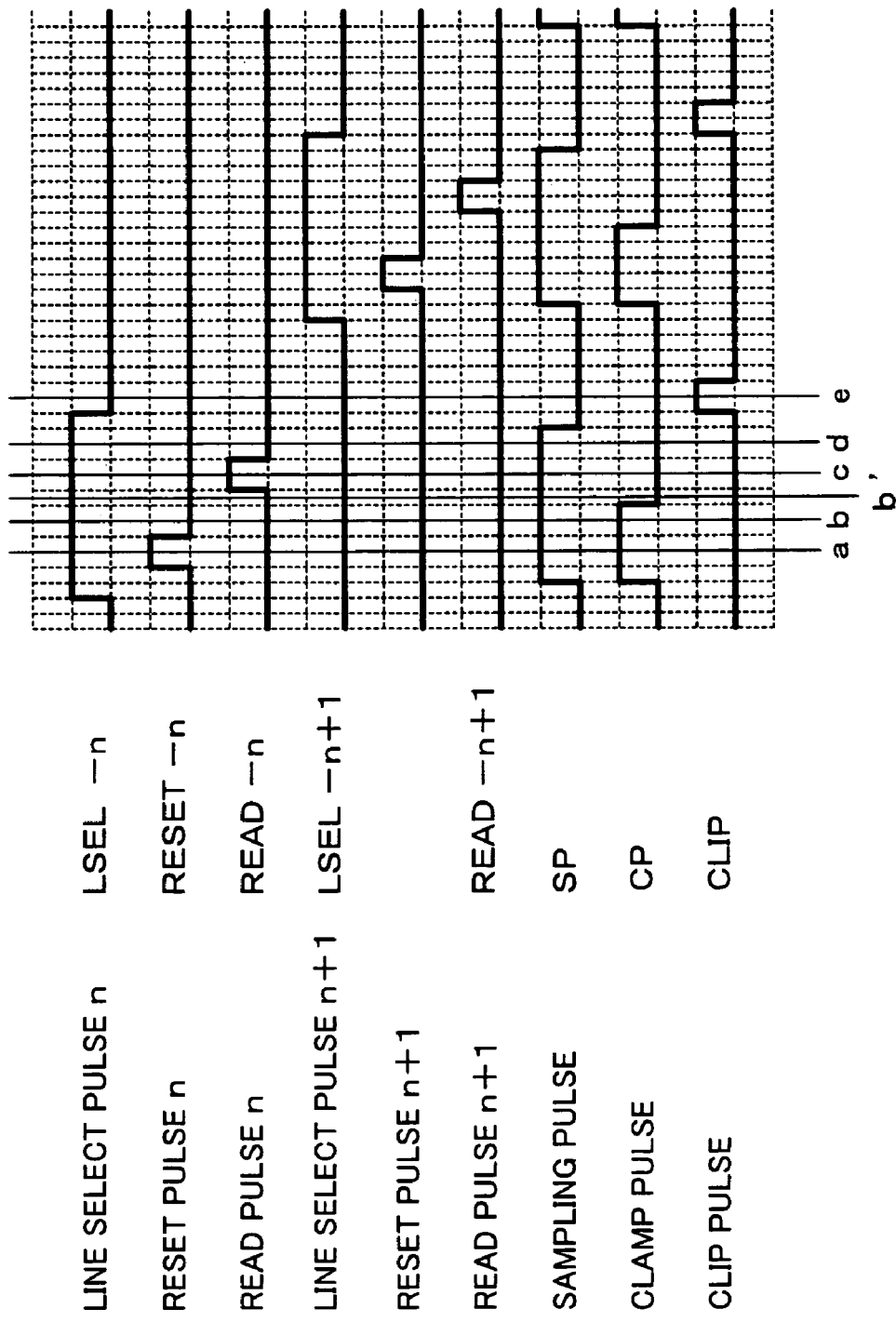
FIG. 12 shows the timings of various control pulses including a clip pulse when a clip transistor 131 included in the imaging device relating to the second embodiment is pulse driven.

FIG. 12. shows the timings of various control pulses including a clip pulse when the clip transistor 131 included in the imaging device relating to the second embodiment is pulse driven.

As shown in FIG. 12, when the clip transistor 131 is pulse driven, the clip pulse is switched ON after the sampling pulse is switched OFF ("e" in FIG. 12), so that the voltage of the second signal output line is regulated so as not to be below a predetermined voltage. Here, the timings "a" to "d" in FIG. 12 are the same as the timings "a" to "d" in FIG. 3.

<Operation 1>

The following describes the operation when the clip transistor 131 is DC driven.

Figure 13:
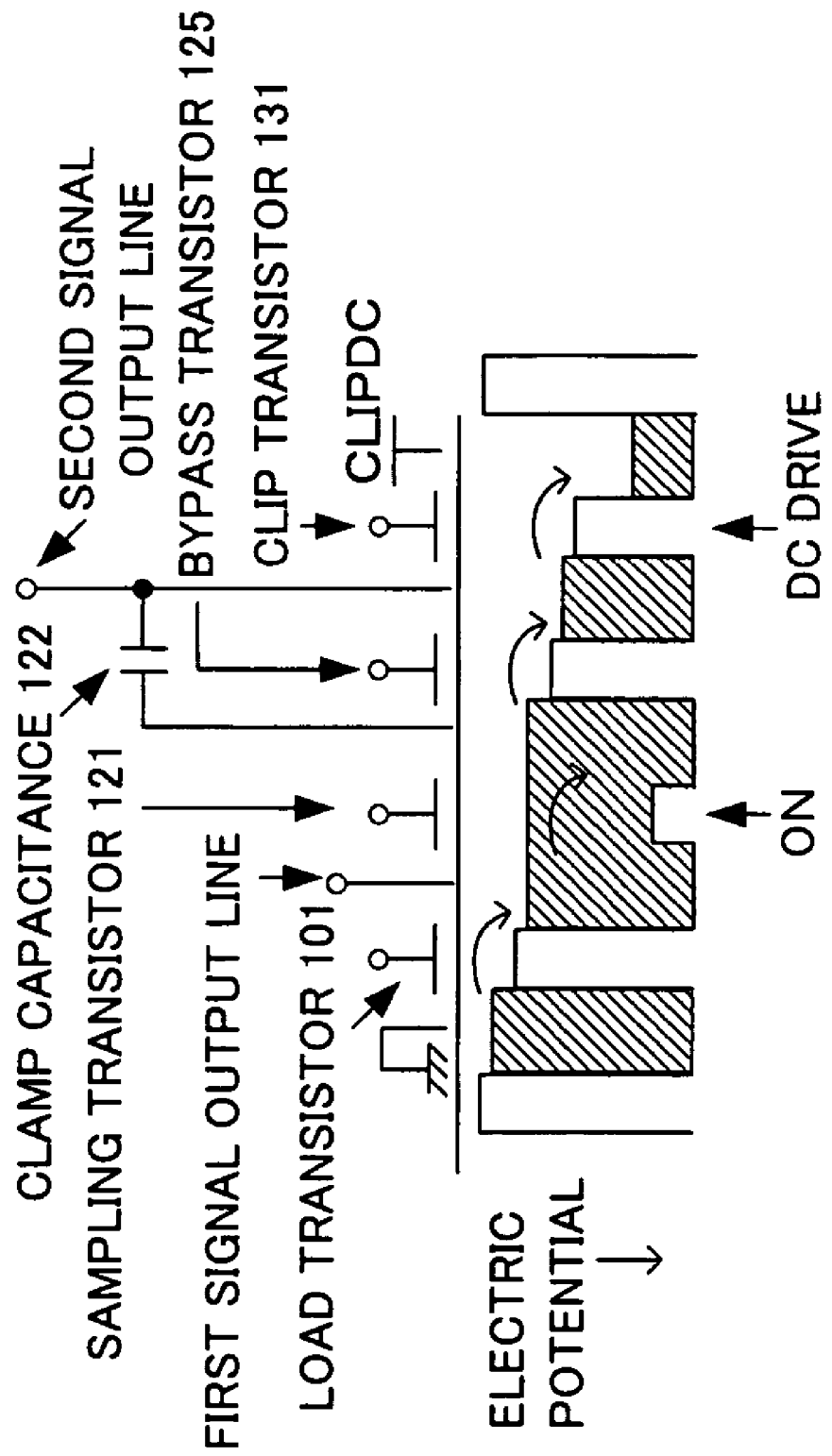
FIG. 13 shows the state of electric potential in each area of a signal processing circuit 130 at the timing "d" in FIG. 3 in the high brightness case.

FIG. 13 shows the state of electric potential in each area of the signal processing circuit 130 at the timing "d" in FIG. 3 in the high brightness case.

Here, FIG. 13 shows in its upper half a schematic circuit configuration and in its lower half the state of electric potential in the areas corresponding to the positions in the circuit shown in the upper half.

The following describes the state of electric potential in each area of the signal processing circuit 120 in the high brightness case, with reference to FIG. 13.

(1) At the timing "d" in FIG. 3, as shown in FIG. 13, the charge of the GND exceeds the barrier potential of the load transistor 101 and is transferred to the first signal output line. Because the sampling transistor 121 is ON, the charge sequentially exceeds the barrier potential of each transistor and is transferred, so that a stationary current flows from the clip voltage terminal (CLIPDC) to the GND. Here, the voltage of the second signal output line is determined by the barrier potential of the clip transistor 131. This means that the voltage of the second signal output line can be set by the gate voltage of the clip transistor 131.

It should be noted here that the barrier potential of the clip transistor 131 may be set by incorporating a depletion-mode transistor as the clip transistor 131 during the manufacture.

Here, the electric potential of the first signal output line is determined by a source follower circuit constructed by the amplifier transistor 115 provided in the pixel circuit 110 and the load transistor 101 provided in the load circuit, and does not necessarily become the same as the electric potential of the GND.

As can be seen from FIG. 13, in the case of DC driving the clip transistor 131, a path on which a current flows from the GND to the CLIPDC is formed. The DC drive therefore has a problem of high power consumption.

<Operation 2>

The following describes the operation when the clip transistor 131 is pulse driven.

Figure 14:
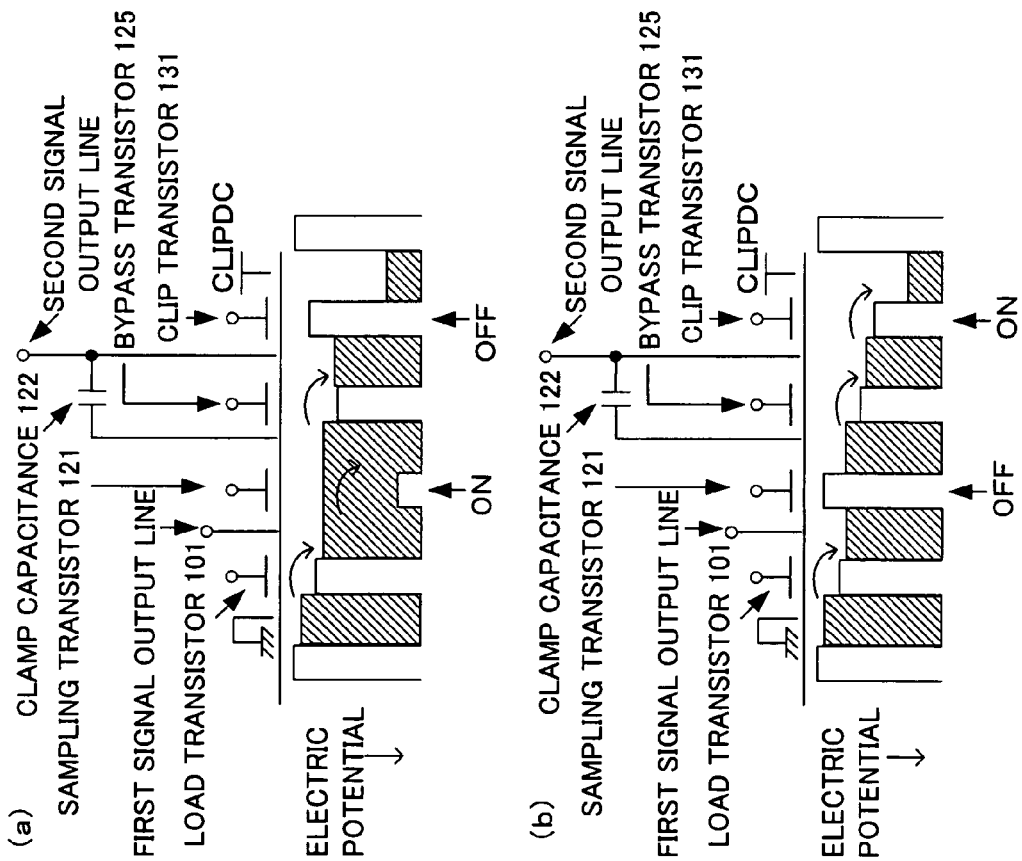
FIG. 14A shows the state of electric potential in each area of the signal processing circuit 130 at the timing "d" in FIG. 12 in the high brightness case.
FIG. 14B shows the state of electric potential in each area of the signal processing circuit 130 at the timing "e" in FIG. 12 in the high brightness case.

FIG. 14A shows the state of electric potential in each area of the signal processing circuit 130 at the timing "d" in FIG. 12 in the high brightness case.

FIG. 14B shows the state of electric potential in each area of the signal processing circuit 130 at the timing "e" in FIG. 12 in the high brightness case.

Here, FIGS. 14A and 14B each show in its upper half a schematic circuit configuration and in its lower half the state of electric potential in the areas corresponding to the positions in the circuit shown in the upper half.

The following describes the state of electric potential in each area of the signal processing circuit 120 in the high brightness case, with reference to FIGS. 14A and 14B.

(1) At the timing "d" in FIG. 12, as shown in FIG. 14A, the charge of the GND exceeds the barrier potential of the load transistor 101 and is transferred to the first signal output line. Because the sampling transistor 121 is ON and the clip transistor 131 is OFF, the charge sequentially exceeds the barrier potential of each transistor and is transferred to the second signal output line.

Here, the electric potential of the first signal output line is determined by a source follower circuit constructed by the amplifier transistor 115 provided in the pixel circuit 110 and the load transistor 101 provided in the load circuit, and does not necessarily become the same as the electric potential of the GND.

(2) At the timing "e" in FIG. 12, as shown in FIG. 14B, the charge of the GND exceeds the barrier potential of the load transistor 101 and is transferred to the first signal output line. Because the sampling transistor 121 is OFF and the clip transistor 131 is ON, the charge sequentially exceeds the barrier potential of each transistor at the right side of the sampling transistor 121 and is transferred, but this charge transfer stops when the voltage of each signal line reaches a voltage that is determined by the barrier potential of each transistor. Here, the voltage of the second signal output line can be set by the pulse voltage of the clip transistor 131.

As can be seen from FIGS. 14A and 14B, in the case of pulse driving the clip transistor 131, a path where a current flows from the GND to the CLIPDC is not formed. The pulse drive therefore is advantageous in its smaller power consumption than the DC drive.

<Conclusions>

In the second embodiment described above, the clip transistor 131 is added to the construction of the imaging device relating to the first embodiment. In the second embodiment, therefore, the voltage of the second signal output line can be set so as not to reach a voltage exceeding an input dynamic range of an output amplifier of the subsequent stage.

Third Embodiment

<Construction>

Figure 15:
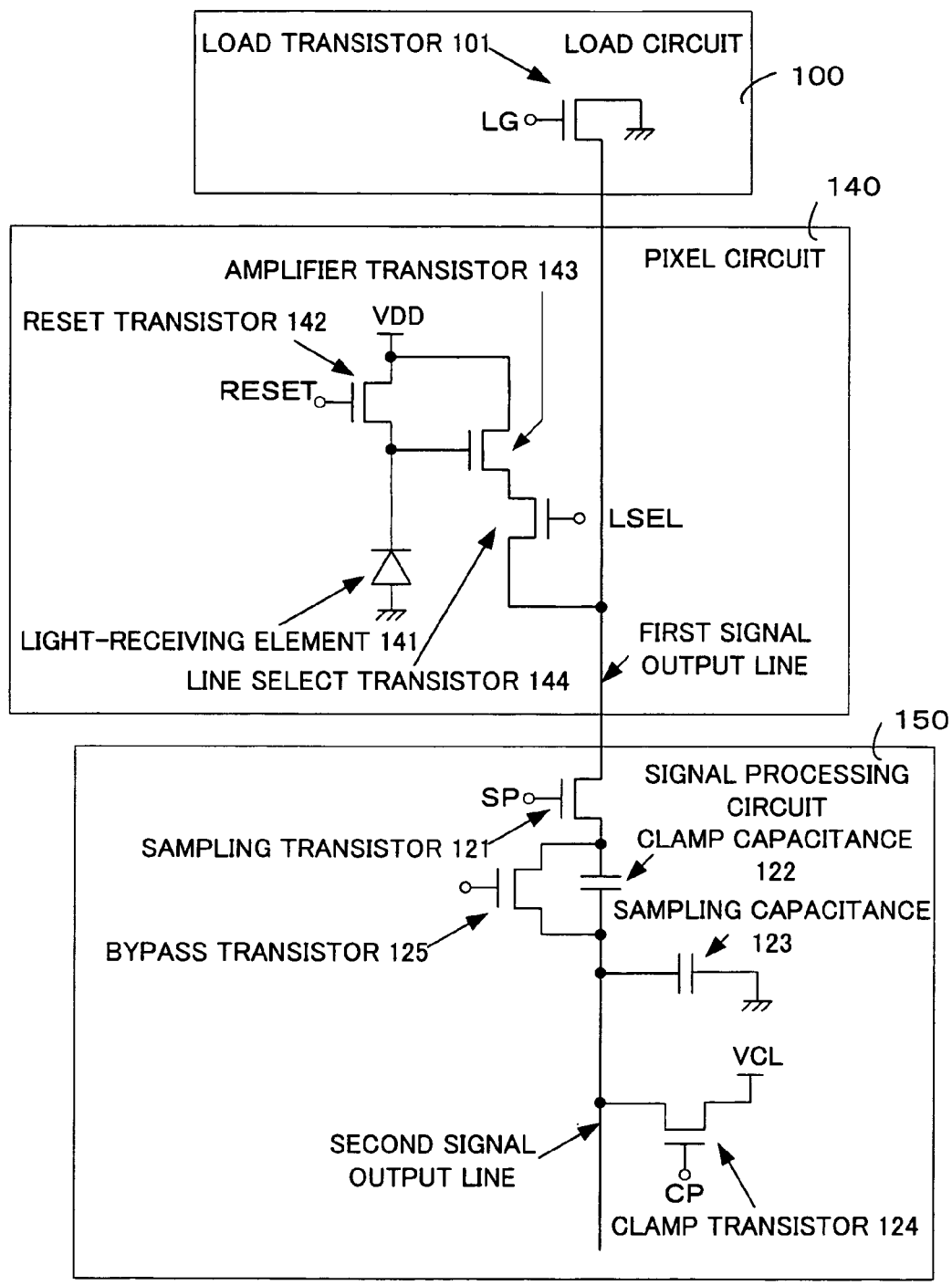
FIG. 15 shows a circuit configuration of an imaging device relating to a third embodiment of the present invention.

FIG. 15 shows a schematic circuit configuration of an imaging device relating to a third embodiment of the present invention.

As shown in FIG. 15, the imaging device relating to the third embodiment includes, instead of the pixel circuit 110 and the signal processing circuit 120 in the first embodiment, a pixel circuit 140 and a signal processing circuit 150.

The pixel circuit 140 is characterized by outputting a reset voltage obtained by amplifying a voltage at reset and a read voltage obtained by amplifying a voltage at reading, to the first signal output line. The pixel circuit 140 includes a light-receiving element 141 such as a photodiode that subjects incident light to photoelectric conversion to generate and accumulate charge and outputs the accumulated charge as a voltage signal, a reset transistor 142 that discharges the accumulated charge in the light-receiving element 141 and resets the voltage therein to an initialization voltage (VDD here), an amplifier transistor 143 that outputs a voltage that follows the voltage indicated by the charge accumulated in the light-receiving element 141, and a line select transistor 144 that outputs an output of the amplifier transistor 143 to the first signal output line upon receipt of a line select signal from the line select encoder 3.

Here, to the pixel circuit 140, a reset pulse (initialization signal: RESET) and a line select pulse (line select signal: LSEL) are supplied at predetermined timings, and to the signal processing circuit 150, a sampling pulse (SP) and a clamp pulse (CP) are supplied at predetermined timings. Transistors corresponding to these control pulses are switched ON and OFF.

The signal processing circuit 150 includes the same components as those of the signal processing circuit 120 in the first embodiment. The signal processing circuit 150 is the same as the signal processing circuit 120 in the first embodiment except that the clamp transistor 124 is connected in series between the second signal output line and a voltage terminal VCL for a clamp in the signal processing circuit 150 whereas the clamp transistor 124 is connected in series between the second signal output line and the reference voltage terminal VDD in the signal processing circuit 120.

Here, it is preferable to set the electric potential of the voltage terminal VCL for a clamp a little higher than the barrier potential VφSKIP of the bypass transistor 125, specifically at around VCL=VφSKIP+0.1V", so that the electric potential of the second signal output line does not exceed the barrier potential of the bypass transistor 125 when the clamp transistor 124 is switched ON.

Here, the electric potential of the VCL may be set by incorporating a depletion-mode transistor as the clamp transistor 124 during the manufacture, or by supplying, with the use of voltage supplying means, a bias voltage constantly or at necessary timings ("c" to "d" in FIG. 16 etc.) to the gate of the clamp transistor 124.

As one example, the bias voltage may be output, in the form of pulses, to the gate of the clamp transistor 124 during when the read voltage is being read from the pixel circuit 140.

Figure 16:
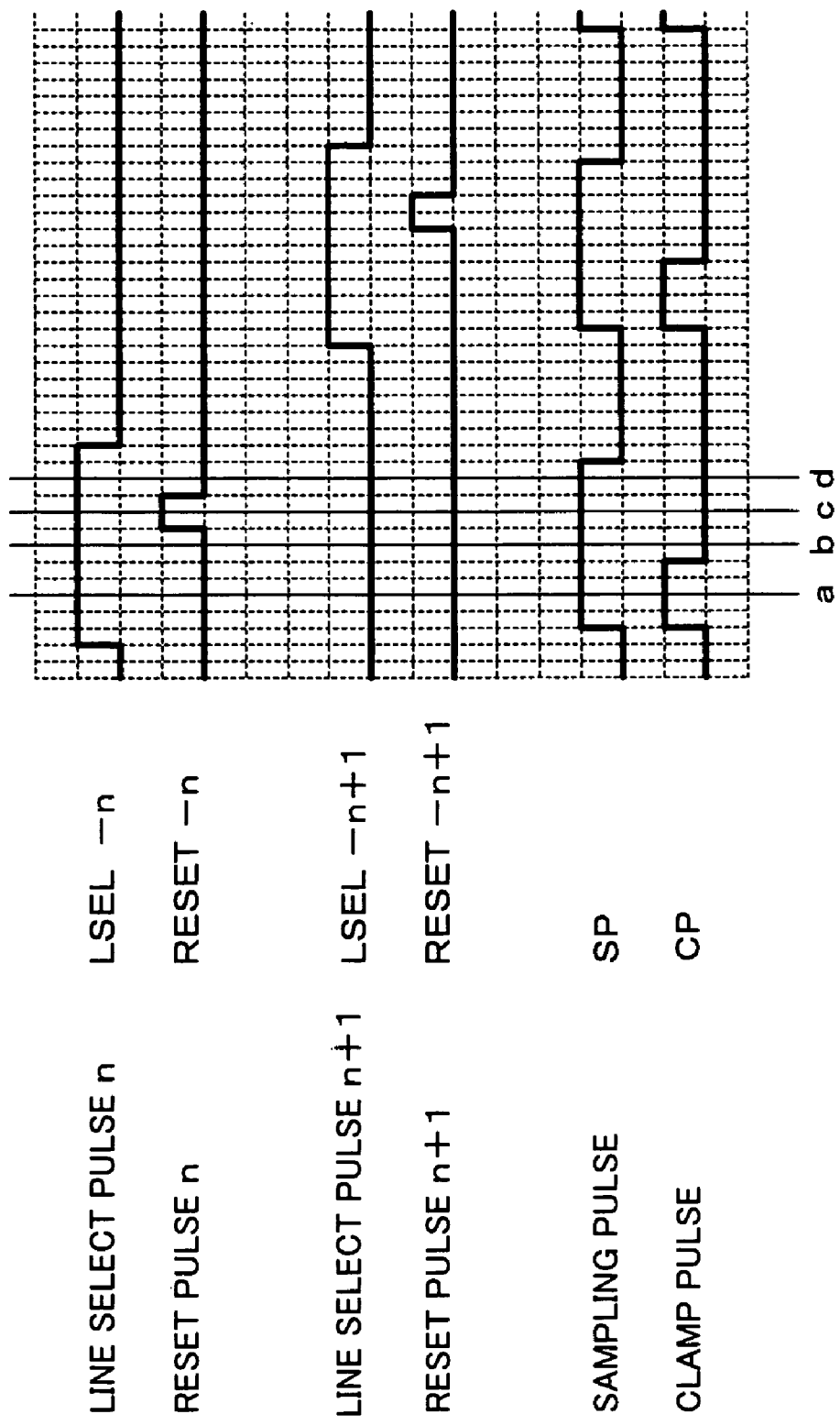
FIG. 16 shows the timings of various control pulses supplied in the imaging device relating to the third embodiment.

FIG. 16 shows the timings of various control pulses supplied in the imaging device relating to the third embodiment.

By supplying the control pulses at the timings shown in FIG. 16, the clamp transistor 124 can be switched ON with the line select transistor 116 being ON, and the second signal output line can be set to the reference voltage with the first signal output line outputting the read voltage ("a" in FIG. 16). Here, when the read voltage is in a predetermined range, an equivalent to a difference between the read voltage and the reference voltage is held by the clamp capacitance 122. After this, the first signal output line outputs the reset voltage ("c" in FIG. 16) with the clamp transistor 124 being OFF ("b" in FIG. 16). The voltage of the second signal output line changes by an amount equivalent to a difference between the reset voltage and the read voltage ("d" in FIG. 16). The resulting voltage can then be output as brightness information. When the read voltage is not in a predetermined range, the bypass transistor 125 brings the first signal output line and the second signal output line into conduction to bypass the clamp capacitance 122, so that there is no difference between the first signal output line and the second signal output line and no charge is held by the clamp capacitance 122. After this, the voltage of the second signal output line is replaced by the reset voltage. The resulting voltage can be output as brightness information.

Here, the predetermined voltage range may be set by incorporating a depletion-mode transistor as the bypass transistor 125 during the manufacture, or by supplying, with the use of voltage supplying means, a bias voltage constantly or at necessary timings ("c" to "d" in FIG. 16 etc.) to the gate of the bypass transistor 125.

As one example, the bias voltage may be output, in the form of pulses, to the gate of the bypass transistor 125 during when the read voltage is being read from the pixel circuit 110.

<Operations>

FIGS. 17A to 17D each show the state of electric potential in each area of the pixel circuit 140 at each timing in the normal case.

FIGS. 17A to 17D respectively correspond to the timings "a" to "d" in FIG. 16.

Figure 18:
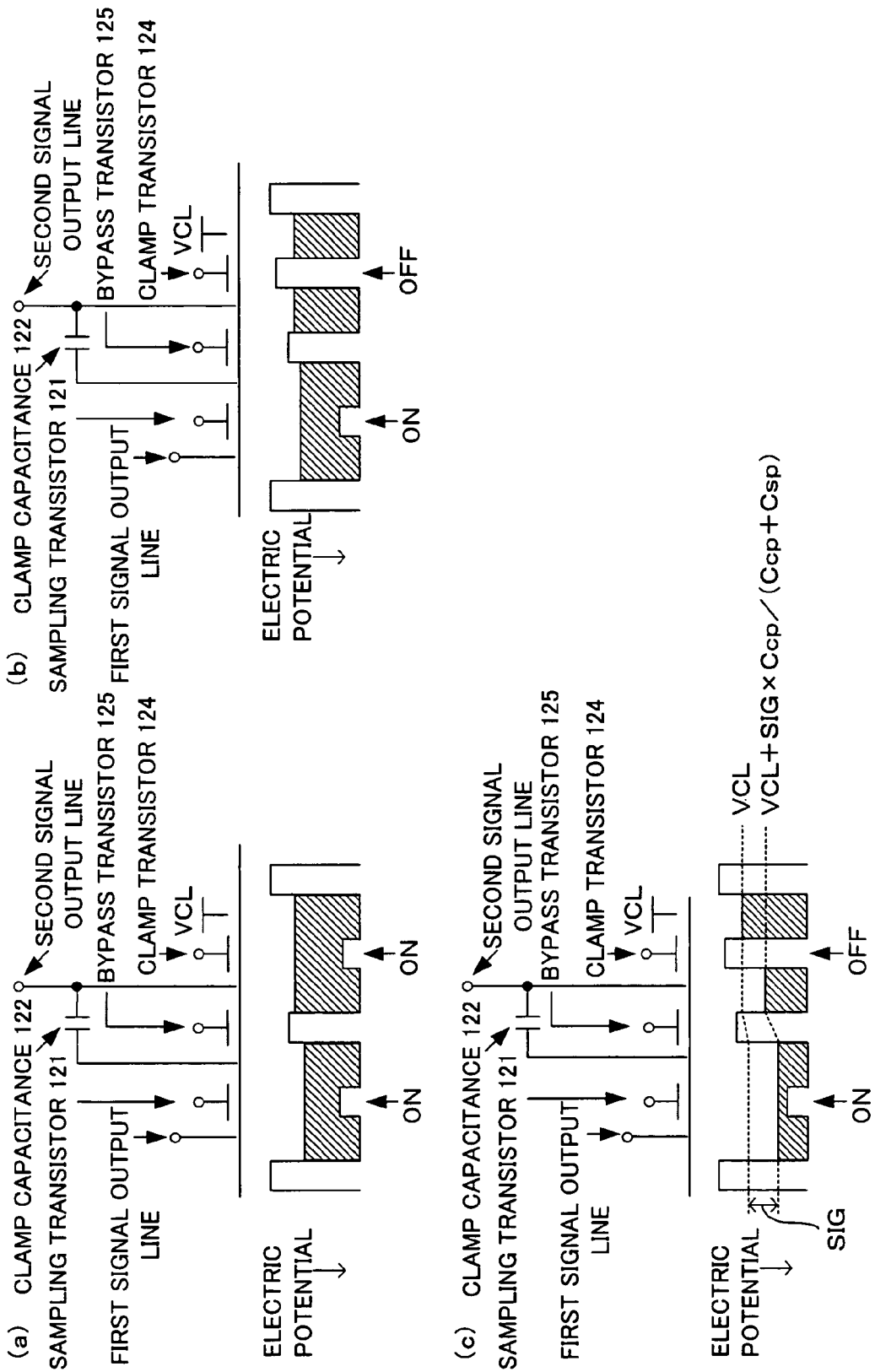
FIG. 18A shows the state of electric potential in each area of a signal processing circuit 150 at the timing "a" in FIG. 16 in the normal case.
FIG. 18B shows the state of electric potential in each area of the signal processing circuit 150 at the timing "b" in FIG. 16 in the normal case.
FIG. 18C shows the state of electric potential in each area of the signal processing circuit 150 at the timing "d" in FIG. 16 in the normal case.

FIG. 18A shows the state of electric potential in each area of the signal processing circuit 150 at the timing "a" in FIG. 16.

FIG. 18B shows the state of electric potential in each area of the signal processing circuit 150 at the timing "b" in FIG. 16.

FIG. 18C shows the state of electric potential in each area of the signal processing circuit 150 at the timing "d" in FIG. 16.

Here, FIGS. 17A to 17D and FIGS. 18A to 18C each show in its upper half a schematic circuit construction and in its lower half the state of electric potential in the areas corresponding to the positions in the circuit shown in the upper half.

The following describes the change of electric potential in each area of the pixel circuit 140 and the change of electric potential in each area of the signal processing circuit 150, with reference to FIGS. 17A to 17D and FIGS. 18A to 18C.

Figure 17:
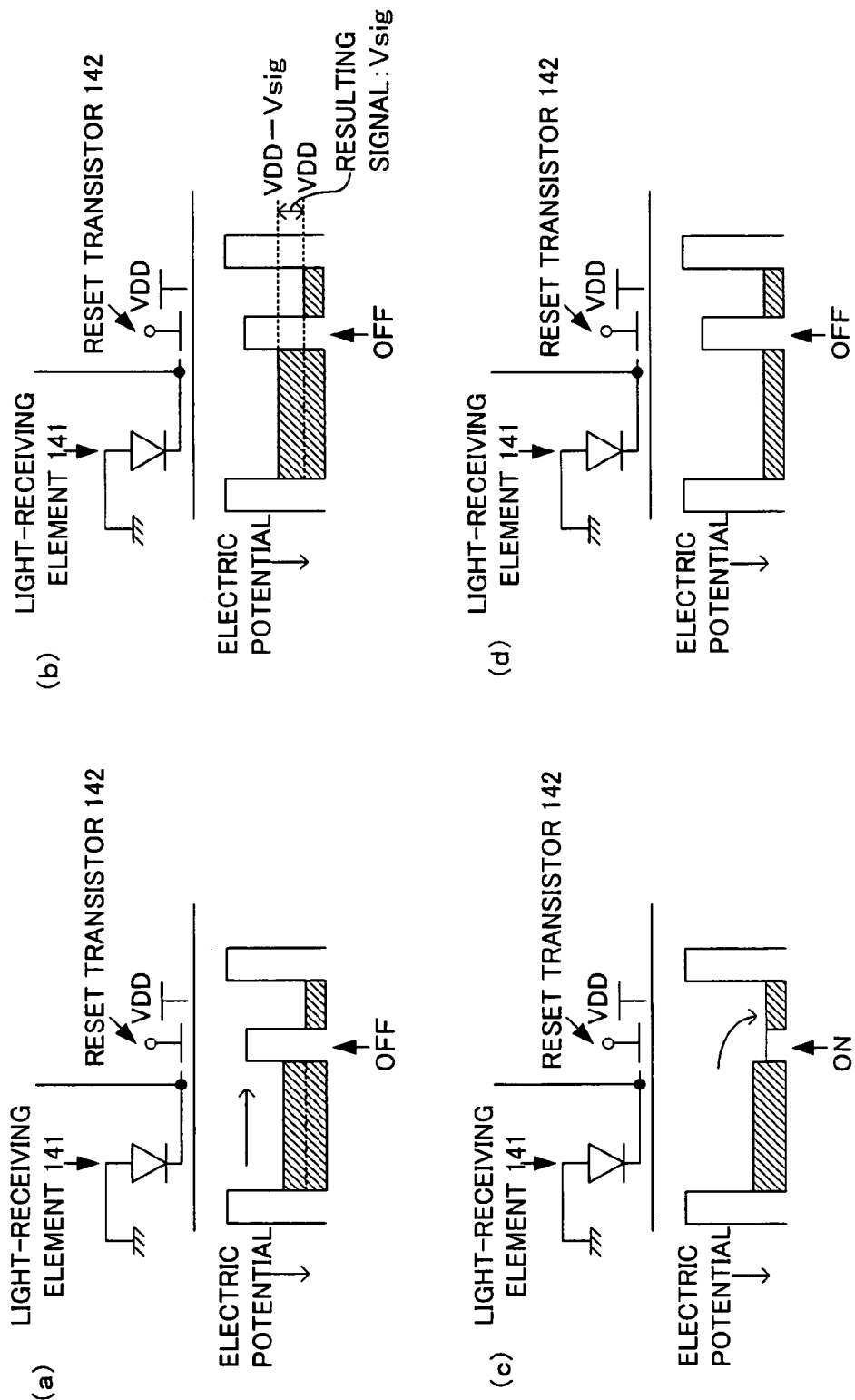
FIGS. 17A to 17D each show the state of electric potential in each area of a pixel circuit 140 at each timing in the normal case.

(1) At the timing "a" in FIG. 16, the reset transistor 142 is OFF, and the voltage of the light-receiving element 141 changes due to the charge generated therein as shown in FIG. 17A. Because the line select transistor 144 is ON, the resulting voltage is amplified by the amplifier transistor 143, and the voltage of the first signal output line changes to the read voltage. Also, because the clamp transistor 124 is ON, the voltage of the second signal output line is reset to the VCL as shown in FIG. 18A.

Here, the barrier potential VφSKIP of the bypass transistor 125 is assumed to be about 0.7V, the voltage terminal VCL for a clamp to be about 0.8V, and the read voltage output to the first signal output line as one example to be about 1.5V.

(2) At the timing "b" in FIG. 16, the clamp transistor 124 is switched from ON to OFF. As shown in FIG. 18B, an equivalent to a difference between the read voltage and the VCL is held by the clamp capacitance 122.

Here, as one example, an equivalent to a difference of about 0.7V between the read voltage of about 1.5V and the VCL of about 0.8V is held by the clamp capacitance 122.

(3) At the timing "c" in FIG. 16, the reset transistor 142 is switched ON. Therefore, as shown in FIG. 17C, the charge generated in the light-receiving element 141 is transferred to the VDD terminal.

(4) At the timing "d" in FIG. 16, the reset transistor 142 is switched from ON to OFF. As shown in FIG. 17D, the voltage of the light-receiving element 141 is reset to the VDD.

Here, the voltage of the light-receiving unit 141 changes to the VDD, and the resulting voltage is amplified by the amplifier transistor 115. Therefore, the voltage of the first signal output line changes to the reset voltage. Also, because the equivalent to the difference between the read voltage and the VCL is held by the clamp capacitance 122, the voltage of the second signal output line becomes a voltage obtained by subtracting the voltage change of the first signal output line from the VCL as shown in FIG. 16C. The resulting voltage is then output as brightness information (assuming the voltage change of the first signal output as SIG, the clamp capacitance 122 as Ccp, and the sampling capacitance 123 as Csp, the voltage of the second signal output line is VCL+SIG×Ccp/(Ccp+Csp)).

Here, assuming as one example the reset voltage Vreset output to the first signal output line to be about 2.0V and Ccp=Csp, the voltage Vnrm of the second signal output line becomes Vnrm=VCL+SIG×Ccp/(Ccp+Csp)=0.8+(2.0−1.5)×(½)=1.05(V)".

FIGS. 19A to 19D each show the state of electric potential in each area of the pixel circuit 140 at each timing in the high brightness case.

Here, FIGS. 19A to 19D respectively correspond to the timings shown in FIGS. 16A to 16D.

Figure 20:
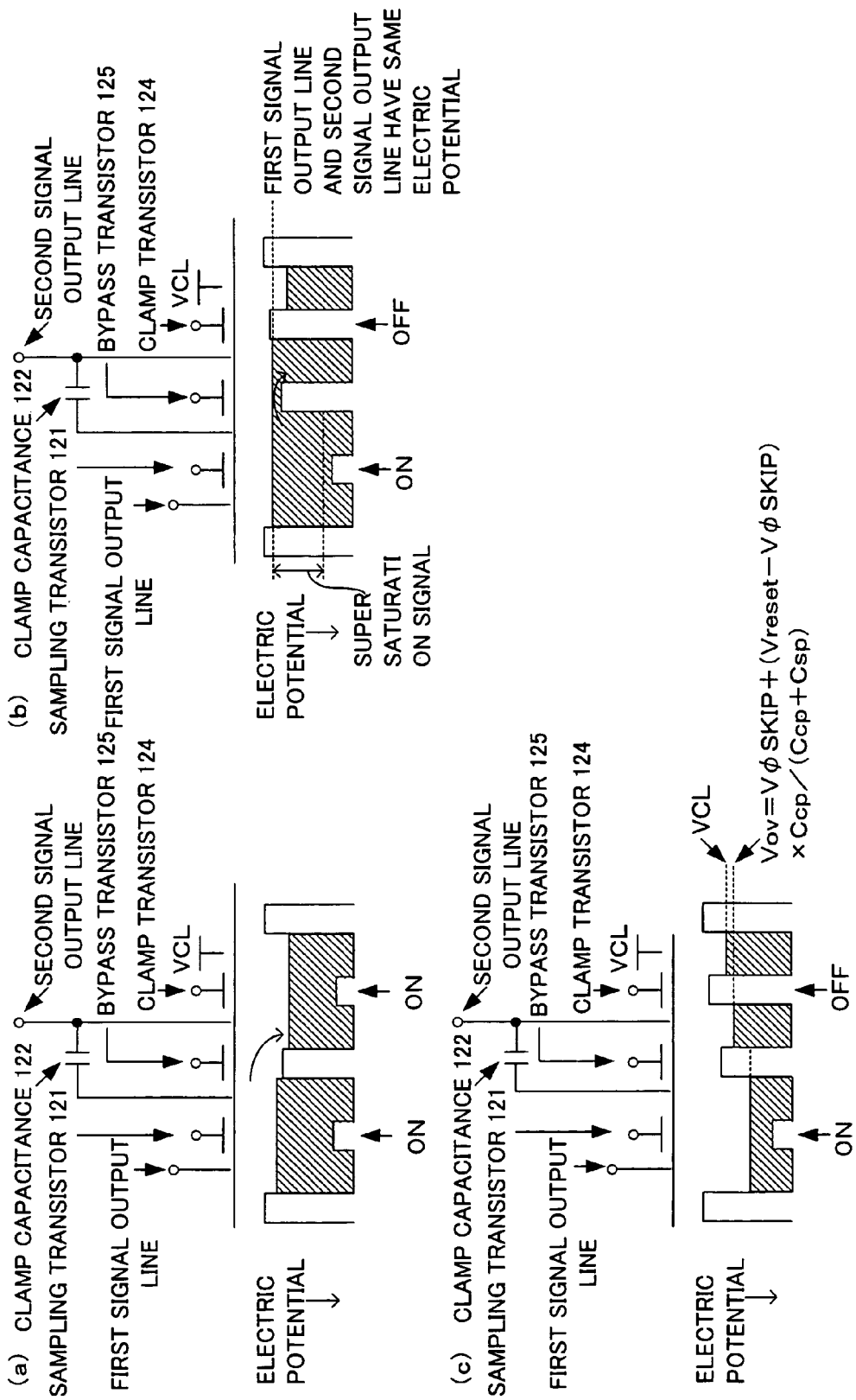
FIG. 20A shows the state of electric potential in each area of the signal processing circuit 150 at the timing "a" in FIG. 16 in the high brightness case.
FIG. 20B shows the state of electric potential in each area of the signal processing circuit 150 at the timing "b" in FIG. 16 in the normal case.
FIG. 20C shows the state of electric potential in each area of the signal processing circuit 150 at the timing "d" in FIG. 16 in the normal case.

FIG. 20A shows the state of electric potential in each area of the signal processing circuit 150 at the timing "a" in FIG. 16 in the high-brightness case.

FIG. 20B shows the state of electric potential in each area of the signal processing circuit 150 at the timing "b" in FIG. 16 in the normal case.

FIG. 20C shows the state of electric potential in each area of the signal processing circuit 150 at the timing "d" in FIG. 16 in the normal case.

Here, FIGS. 19A to 19D and FIGS. 20A to 20C each show in its upper half a schematic circuit construction and in its lower half the state of electric potential in the areas corresponding to the positions in the circuit shown in the upper half.

The following describes the change of electric potential in each area of the pixel circuit 140 and the change of electric potential in each area of the signal processing circuit 150, with reference to FIGS. 19A to 19D and FIGS. 20A to 20C.

Figure 19:
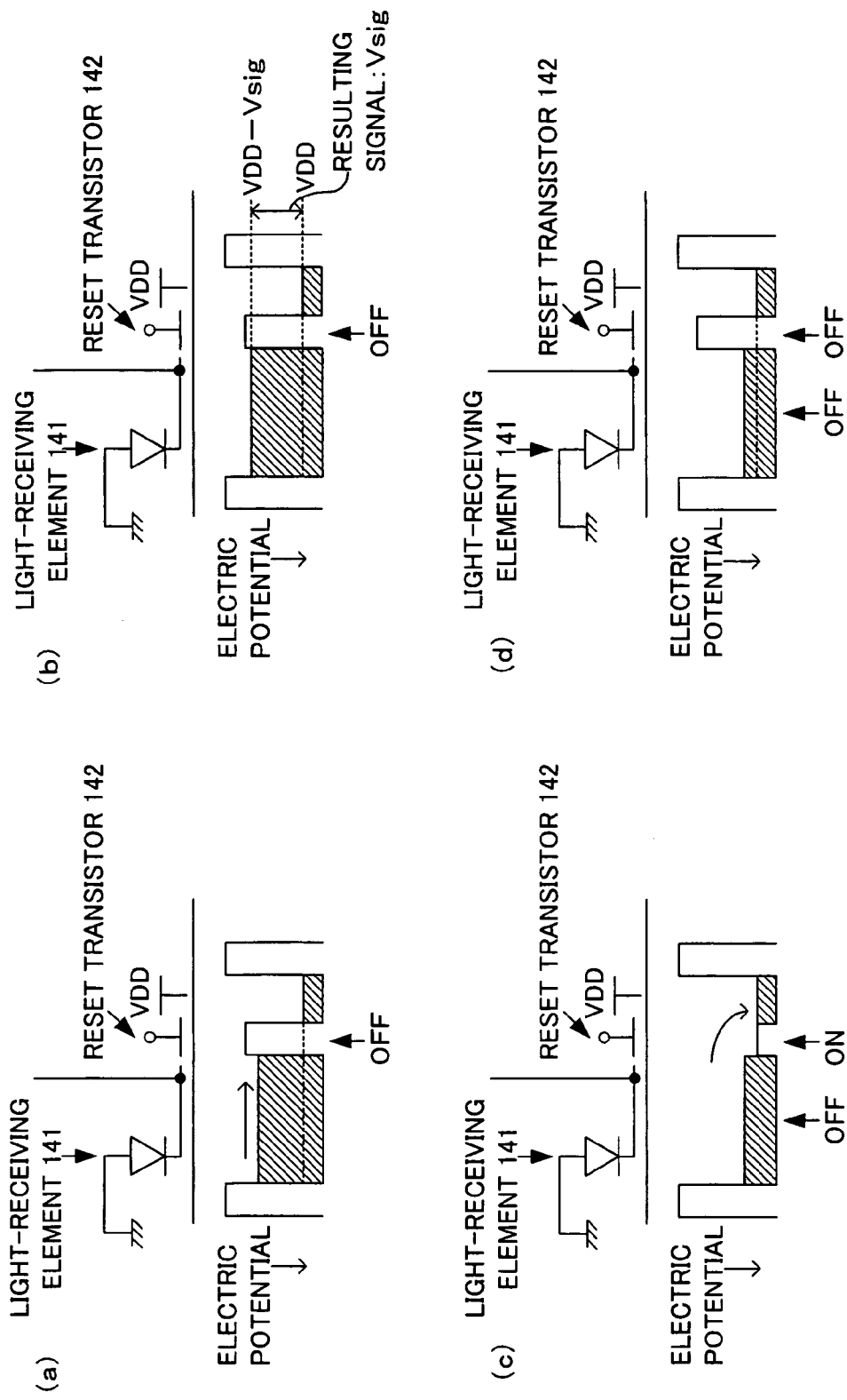
FIGS. 19A to 19D each show the state of electric potential in each area of the pixel circuit 140 at each timing in the high brightness case.

(1) At the timing "a" in FIG. 16, the reset transistor 142 is OFF. As shown in FIG. 19A, the voltage of the light-receiving element 141 changes due to the charge generated therein. Because the line select transistor 144 is ON, the resulting voltage is amplified by the amplifier transistor 143, and the voltage of the first signal output line changes to the read voltage. Also, because the clamp transistor 124 is ON, the voltage of the second signal output line is reset to the VCL.

Here, the barrier potential VφSKIP of the bypass transistor 125 is assumed to be about 0.7V, the voltage terminal VCL for a clamp to be about 0.8V, and the read voltage output to the first signal output line as one example to be about 0.5V.

(2) At the timing "b" in FIG. 16, the clamp transistor 124 is switched from ON to OFF. Here, in the normal case, an equivalent to a difference between the read voltage and the reference voltage is held by the clamp capacitance 122. In the high brightness case as shown in FIG. 20B, however, the barrier potential of the read transistor exceeds the barrier potential of the bypass transistor 125 and the bypass transistor 125 brings the first signal output line and the second signal output line into conduction to bypass the clamp capacitance 122. Therefore, no charge is held by the clamp capacitance 122.

Here, as one example, a read voltage of about 0.5V exceeds a VφSKIP of about 0.7V, and therefore, the voltage of the first signal output line and the voltage of the second signal output line both become about 0.5V. No charge is therefore held by the clamp capacitance 122.

(3) At the timing "c" in FIG. 16, the reset transistor 142 is switched ON. As shown in FIG. 19C, therefore, the charge generated in the light-receiving element 141 is transferred to the VDD terminal.

(4) At the timing "d" in FIG. 16, although the reset transistor 142 is switched from ON to OFF, as shown in FIG. 19D, the light-receiving element 141 outputs a voltage a little lower than the VDD, due to the charge generated in the high brightness case.

Here, because no charge is held by the clamp capacitance 122, as shown in FIG. 20C, the voltage of the second signal output line becomes an equivalent to the reset voltage, indicating high brightness. The resulting voltage is then output as brightness information.

To be more specific, when the voltage of the first signal output line exceeds the barrier potential of the bypass transistor, the voltage of the first signal output line is equal to the voltage of the second signal output line. When the voltage of the first signal output line is higher than the barrier potential of the bypass transistor, the voltage of the second signal output line changes at a ratio fixed by the sampling capacitance Csp and the clamp capacitance Ccp with respect to the voltage change of the first signal output line. The voltage Vov of the second signal output line at this time is written as VoV=VφSKIP+(Vreset−VφSKIP)×Ccp/(Ccp+Csp).

Here, assuming as one example the reset voltage Vreset output to the first signal output line to be about 1.9V and Ccp=Csp, the voltage Vov of the second signal output line becomes Vov=VφSKIP+(Vreset−VφSKIP)×Ccp/(Ccp+Csp)
=0.7+(1.9−0.7)×(½)=1.3(V).

In the above example, the inequality Vov>Vnrm is satisfied.

However, when VCL>>VφSKIP, the inequality VoV>Vnrm is not satisfied. Therefore, a difference between the VCL and the VφSKIP needs to be in such a range that satisfies the inequality VoV>VφSKIP as in the above example. As one example, it is preferable that the VCL is about 0.8V and the VφSKIP is about 0.7V with the difference between the VCL and the VφSKIP being about 0.1V.

<Conclusions>

The imaging device relating to the third embodiment has the same output voltage characteristics as those of the imaging device relating to the first embodiment. When the read voltage exceeds a predetermined voltage, the output voltage is replaced by a voltage indicating high brightness. Therefore, underexposure or shadow detail loss of an image can be prevented, and the same effects as produced in the first embodiment can be produced in the third embodiment.

[Modification 1]

Figure 21:
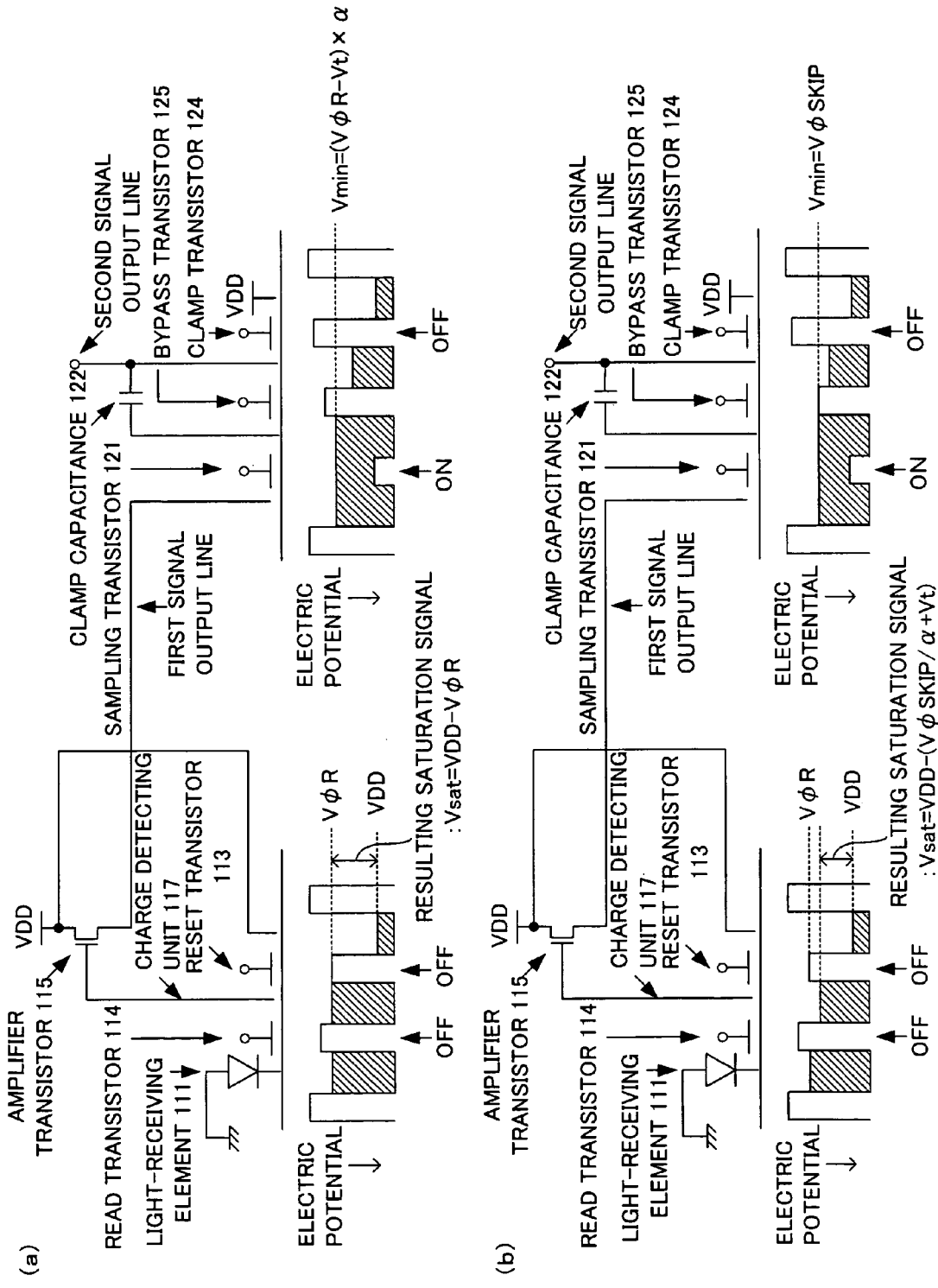
FIGS. 21A and 21B each show the relationship between a barrier potential of a reset transistor and a barrier potential of a bypass transistor.

FIGS. 21A and 21B show the relationship between the barrier potential of the reset transistor and the barrier potential of the bypass transistor.

The following describes the relationship between the barrier potential VφR of the reset transistor and the barrier potential VφSKIP of the bypass transistor.

Here, an amplification factor of the amplifier transistor is assumed to be α and a threshold voltage is assumed to be Vt.

As shown in FIG. 21A, when the VφSKIP is set equal to or smaller than the minimum potential Vmin=(VφR−Vt)×α of the first signal output line determined by the VφR(VφSKIP/α+Vt≦VφR), the saturation signal Vsat becomes Vsat=VDD−VφR, so that the maximum virtual electric potential of the saturation signal output can be secured. However, the bypass transistor is not switched ON in the high brightness case, and therefore the bypass transistor does not work.

As shown in FIG. 21B, when the VφSKIP is set larger than the minimum potential Vmin=(VφR−Vt)×α of the first signal output line determined by the VφR (VφSKIP/α+Vt>VφR), the saturation signal Vsta becomes Vsta=VDD−(VφSKIP/α+Vt). When a difference between the VφSKIP and the Vmin is larger than a predetermined value, the bypass transistor works. However, the virtual electric potential of the saturation signal output decreases as this difference increases.

Here, it is preferable that the difference between the VφSKIP and the Vmin is about 0.1V.

It should be noted here that the bypass transistor and the reset transistor may be manufactured in one process, and the bias voltage may be supplied to the gate of the bypass transistor. Here, the difference between the barrier potential of the bypass transistor and the electric potential of the saturation signal output may be set using the bias voltage.

Also, the reset transistor may be manufactured by a predetermined process of burying it through injection, and the bypass transistor may be manufactured by the predetermined process of burying it through injection and an additional injection process. Here, the difference between the barrier potential of the bypass transistor and the electric potential of the saturation signal output may be set using the bias voltage.

<Conclusions>

According to the modification 1 as described above, a sufficient level of the virtual electric potential of the saturation signal output can be secured, and also, the bypass transistor can work, thereby producing an expected effect.

[Modification 2]

For the imaging device, a vertical blanking period, during which brightness information of a predetermined number of pixels is not output from the imaging unit, is provided for each frame.

If the imaging device is driven during the vertical blanking period in the same manner as in normal periods, the electric potential of the first signal output line becomes 0V due to the load circuit, and a saturation signal is excessively output during the vertical blanking period. The problem here is that an input dynamic range of an output amplifier of the subsequent stage is restricted, and a small signal cannot be sufficiently amplified.

To solve this problem, the modification 2 of the present invention provides an imaging device that does not output a saturation signal during the vertical blanking period, an imaging method, and the like.

Figure 22:
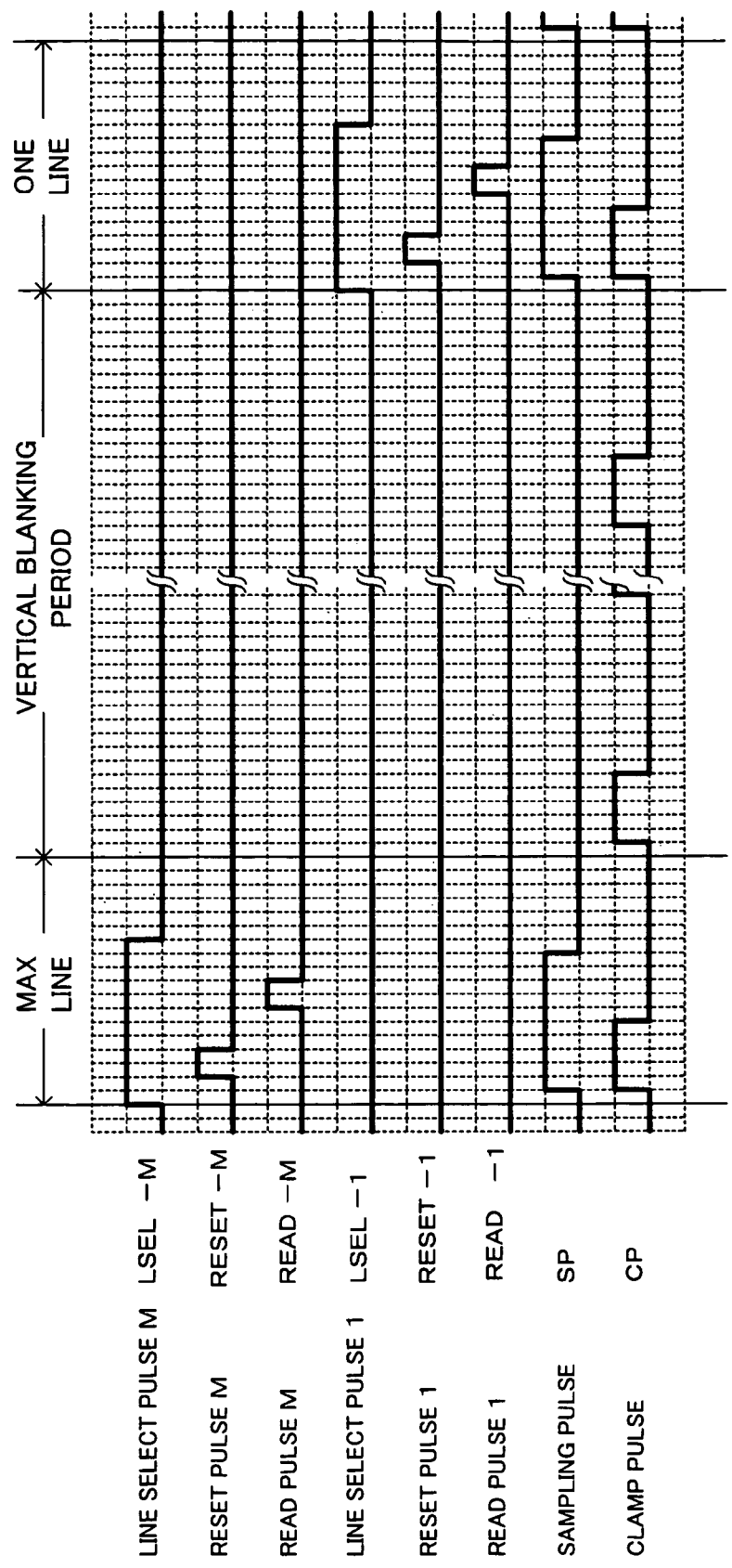
FIG. 22 shows the timings of a sampling pulse relating to modification 2.

FIG. 22 shows the timings of a sampling pulse in the modification 2.

The sampling pulse shown in FIG. 22 is an output example in an imaging device that has the same construction as the imaging device relating to the first embodiment. The sampling pulse is assumed to be output from the sampling transistor control unit included in the column select encoder 4.

As shown in FIG. 22, the sampling transistor control unit does not output a sampling pulse during the vertical blanking period. Therefore, the sampling transistor 121 is brought out of conduction, and no charge is held by the clamp capacitance 122. As a result, brightness information indicating low brightness is output.

<Conclusions>

According to the modification 2 as described above, a saturation signal is not output during the vertical blanking period, and therefore an input dynamic range of an output amplifier of the subsequent stage is not restricted.

[Modification 3]

To solve the same problem as dealt with by the modification 2, the modification 3 of the present invention provides an imaging device that does not output a saturation signal during the vertical blanking period, an imaging method, and the like.

Figure 23:
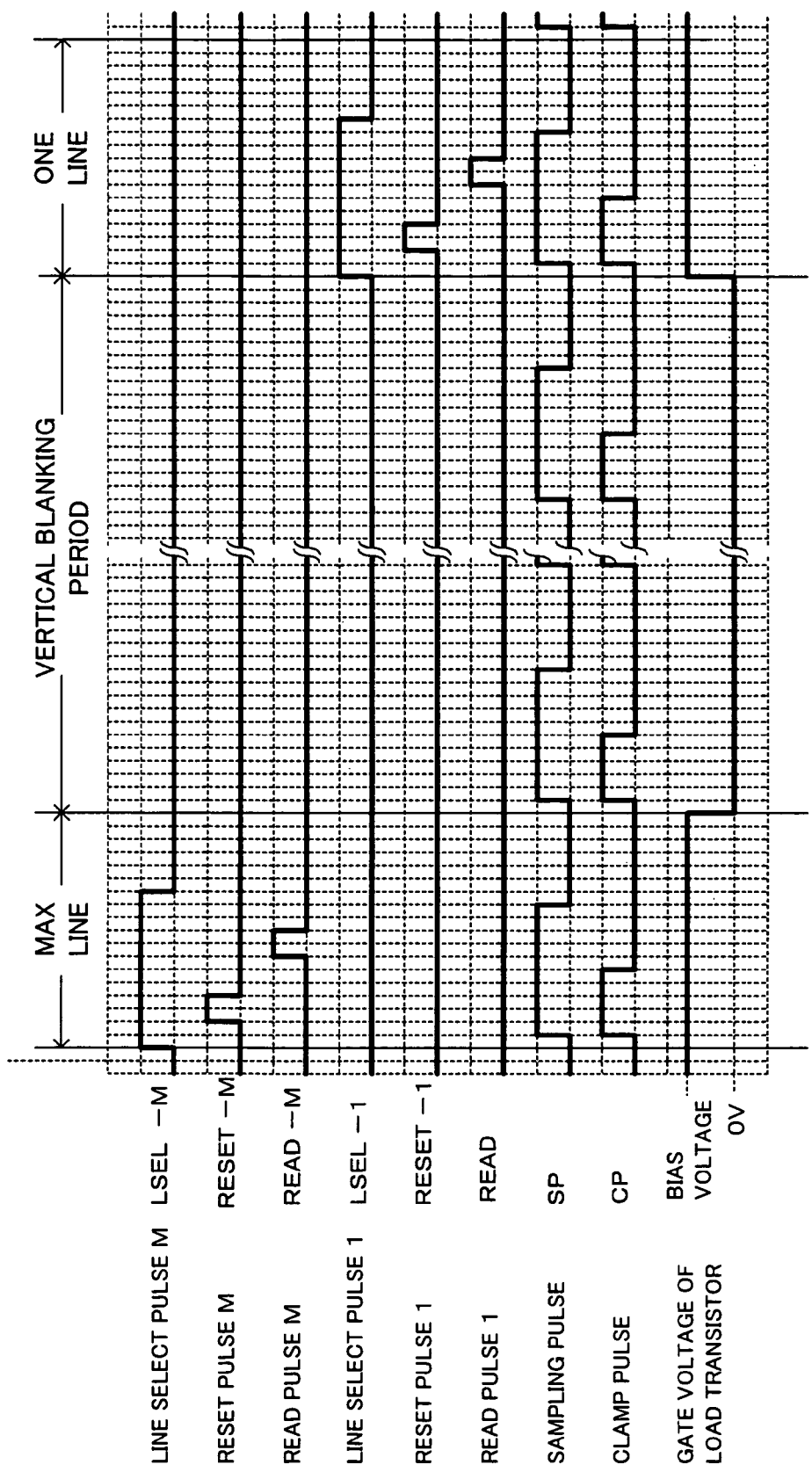
FIG. 23 shows the timings of control over a load transistor relating to modification 3.

FIG. 23 shows the timings of a sampling pulse in the modification 3.

The control over the gate voltage of the load transistor shown in FIG. 23 is a control example in an imaging device that has the same construction as the imaging device relating to the first embodiment. The control is assumed to be performed by the load transistor control unit included in the column select encoder 4.

As shown in FIG. 23, the load transistor control unit does not apply a bias voltage to the load transistor during the vertical blanking period. Therefore, the load transistor 101 is brought out of conduction, and no charge is held by the clamp capacitance 122. As a result, brightness information indicating low brightness is output.

<Conclusions>

According to the modification 3 as described above, a saturation signal is not output during the vertical blanking period, and therefore an input dynamic range of an output amplifier of the subsequent stage is not restricted.

It should be noted here that each circuit used to describe the present invention is a mere example, and other circuits and the like having the same functions as the above-described circuits may instead be used.

Also, instead of each signal processing circuit, a general-purpose processor may be used to separately measure the reset voltage and the read voltage, and realize the processing performed by each signal processing circuit based on the measurement results. Alternatively, the imaging device may be operated using a conventional signal processing circuit in the normal case, and may be operated using a general-purpose processor in the case judged as the high brightness case when the read voltage is not in a predetermined range and may replace the output signal by a voltage indicating high brightness in the high brightness case.

Also, to set the bias voltages supplied by the voltage supplying means to the gates of the clamp transistor, the bypass transistor, etc., at appropriate values for an individual imaging device, the voltage supplying means may include a bias voltage setting circuit that enables each bias voltage to be set from outside and that can store the set value of each bias voltage.

This bias voltage setting circuit includes, for each transistor to which the bias voltage is to be supplied, a plurality of parallel-connected wires made of polysilicon or the like that can be disconnected by for example applying a predetermined voltage to their specific terminals from outside, and includes elements that are connected to the wires and that can change a voltage of the same or different resistance or the like. In the final stage of the manufacturing, appropriate ones of the wires are disconnected in such a manner that the electric potential of the connected transistor is set at an optimum value by monitoring the output data. As one example, to set a difference between the barrier potential of the bypass transistor and the electric potential of the saturation signal output at an optimum value, appropriate ones of the wires may be disconnected in such a manner that the bias voltage of the bypass transistor is set at an optimum value by monitoring the voltage of the second signal output line.

Also, although the above embodiments and modifications of the present invention describe the case where the signal charge is realized by an electron, the signal charge may be realized by an electron hole. When the signal charge is realized by an electron hole, the signal polarity is inverse and the magnitude relation of the electric potential is the opposite, compared with when the signal charge is realized by an electron.

Although the above embodiments and modifications of the present invention describe the case where a MOS amplifier transistor is used, the present invention can be realized by using an imaging device that requires a circuit for removing FPN (fixed pattern noise) such as CMD, BASIS, and SIT.

INDUSTRIAL APPLICATION

The present invention is applicable to imaging devices such as home video cameras and digital still cameras. The present invention provides a solid-state imaging device that can effectively solve the problem of shadow detail loss of an image underexposed due to incident strong light compared with conventional devices, and that can ensure elimination of an adverse effect by a change in a voltage at reset, and thereby contributing to improvement in image quality of imaging devices.

The present invention is applicable not only to home imaging devices but also to any other types of imaging devices.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An imaging device that outputs brightness information according to an amount of incident light, comprising:

an imaging unit that (a) includes a plurality of unit cells arranged one dimensionally or two-dimensionally, each unit cell including a photoelectric conversion part that generates a first output voltage in a reset state and a second output voltage according to an amount of incident light, and each unit cell generating a reset voltage that corresponds to the first output voltage and a read voltage that corresponds to the second output voltage, and (b) outputs the reset voltage and the read voltage of each unit cell as signals in units of columns;

a signal processing unit that (a) is formed by connecting same circuits corresponding in one-to-one to the columns, (b) processes the signals output in units of columns from the imaging unit, and (c) sequentially outputs the processed signals, wherein in relation to each unit cell, the signal processing unit (a) outputs first brightness information indicating a difference between the reset voltage and the read voltage when normal light is incident to the imaging device and the read voltage is in a predetermined range, and (b) replaces the first brightness information with second brightness information indicating higher brightness than the first brightness information and then outputs the second brightness information when strong light is incident to the imaging device and the read voltage is not in the predetermined range;

an output unit operable to (a) subject the processed signals, which have been output by the signal processing unit, to necessary conversion, and (b) output the processed signals that have been subjected to the necessary conversion;

a first output line that is connected to the imaging unit and receives the reset voltage and the read voltage output from each unit cell;

a second output line that outputs the first brightness information or the second brightness information from the signal processing unit to the output unit;

a clamp capacitance that is connected in series between the first output line and the second output line; and a bypass transistor that is connected in parallel with the clamp capacitance, and brings the first output line and the second output line out of conduction not to bypass the clamp capacitance in a first case where a voltage applied between terminals of the clamp capacitance is in the predetermined range, and brings the first output line and the second output line into conduction to bypass the clamp capacitance in a second case where the voltage applied between the terminals is not in the predetermined range.

2. The imaging device of claim 1, wherein the first case is where an electric potential of the first output line is higher than a barrier potential of the bypass transistor, and the second case is where the electric potential of the first output line is equal to or smaller than the barrier potential of the bypass transistor.

3. The imaging device of claim 2, further comprising:

a sampling capacitance that is connected in series between the second output line and a terminal for supplying a predetermined voltage;

a clamp transistor that is connected in series between the second output line and a terminal for supplying a reference voltage; and a control unit operable to control a reset voltage to be output to the first output line in a state where the clamp transistor is ON and the second output line is set at the reference voltage, and then control a read voltage to be output to the first output line in a state where the clamp transistor is OFF, and wherein when a reset voltage that is in the predetermined range is output to the first output line in a state where the clamp transistor is ON and the second output line is set at the reference voltage, an equivalent to a difference between the reference voltage and the reset voltage is held by the clamp capacitance, and then when a read voltage that is in the predetermined range is output to the first output line in a state where the clamp transistor is OFF, a voltage of the second output line changes from the reference voltage by an amount corresponding to the equivalent held by the clamp capacitance, so that the first brightness information is output, and when a read voltage that is not in the predetermined range is output to the first output line in a state where the clamp transistor is OFF, the bypass transistor brings the first output line and the second output line into conduction to bypass the clamp capacitance and so the voltage of the second output line is replaced by the read voltage, so that the second brightness information is output regardless of whether the reset voltage is in the predetermined range.

4. The imaging device of claim 2, further comprising:

a sampling capacitance that is connected in series between the second output line and a terminal for supplying a predetermined voltage;

a clamp transistor that is connected in series between the second output line and a terminal for supplying a reference voltage; and a control unit operable to switch the clamp transistor ON in a state where a read voltage is output to the first output line, and then switch the clamp transistor OFF and controls a reset voltage to be output to the first output line, and wherein when the clamp transistor is switched ON in a state where a read voltage that is in the predetermined range is output to the first output line, an equivalent to a difference between the reference voltage and the read voltage is held by the clamp capacitance, and then the clamp transistor is switched OFF and a reset voltage that is in the predetermined range is output to the first output line, and a voltage of the second output line changes from the reset voltage by an amount corresponding to the equivalent held by the clamp capacitance, so that the first brightness information is output, and the bypass transistor brings the first output line and the second output line into conduction to bypass the clamp capacitance in a state where a read voltage that is not in the predetermined range is output to the first output line and so no voltage is held by the clamp capacitance, so that the second brightness information is output.

5. The imaging device of claim 2, further comprising:

a voltage supplying unit operable to supply a bias voltage to a gate of the bypass transistor.

6. The imaging device of claim 2, wherein the bypass transistor is a depletion-mode transistor.

7. The imaging device of claim 2, wherein each unit cell includes:

a light-receiving element operable to generate charge according to an amount of incident light;

a charge detecting unit operable to hold the charge generated by the light-receiving element and output the charge as a voltage signal;

a reset transistor that is connected in series between a reset terminal for supplying a reference voltage and the charge detecting unit, and when a gate voltage is applied thereto, the reset transistor is brought into conduction, so that the charge detecting unit is reset to the reference voltage; and an amplifier transistor that is connected between an amplifier terminal for supplying a reference voltage and the first output line, and when a voltage signal converted by the charge detecting unit is applied to a gate thereof, the voltage signal is amplified and the amplified voltage signal is output to the first output line, and wherein a barrier potential of the bypass transistor is higher by a predetermined amount than an electric potential of a saturation signal that is an output of the amplifier transistor and that depends on an electric potential of the reset transistor being out of conduction.

8. The imaging device of claim 7, wherein a difference between the barrier potential of the bypass transistor and the electric potential of the saturation signal is substantially 0.1V.

9. The imaging device of claim 7, further comprising:

a voltage supplying unit operable to supply a bias voltage to a gate of the bypass transistor, and wherein a difference between the barrier potential of the bypass transistor and the electric potential of the saturation signal is set by the bias voltage.

10. The imaging device of claim 9, wherein the bypass transistor and the reset transistor are manufactured in one process.

11. The imaging device of claim 9,
wherein the voltage supplying unit includes a bias setting circuit that enables an appropriate bias unique to the imaging device to be set from outside.

12. The imaging device of claim 7,
wherein the reset transistor is manufactured by a predetermined process of burying through injection, and
the bypass transistor is manufactured by the predetermined process of burying through injection and an additional injection process, and
wherein a difference between the barrier potential of the bypass transistor and the electric potential of the saturation signal is set by the additional injection process.

13. The imaging device of claim 7,
wherein a first substrate bias voltage is applied to the bypass transistor, the first substrate bias voltage having an electric potential different from a second substrate bias voltage applied to the reset transistor, and
wherein a difference between the barrier potential of the bypass transistor and the electric potential of the saturation signal is controlled by a difference between the first substrate bias voltage and the second substrate bias voltage.

14. The imaging device of claim 2, further comprising:
a clip transistor operable to output, as the second brightness information, a voltage matching an input dynamic range of the circuit of the subsequent stage that is an analogue circuit, when a voltage that is a difference between an electric potential of the first output line and an electric potential of the second output line is not in the predetermined range.

15. The imaging device of claim 14,
wherein the clip transistor is connected between a terminal for supplying a voltage corresponding to a maximum voltage of the input dynamic range of the circuit of the subsequent stage and the second output line, and when a predetermined voltage is applied to a gate thereof, the clip transistor is temporarily brought into conduction, so that a voltage matching the input dynamic range is output from the second output line to the circuit of the subsequent stage, and
the imaging device further comprises a clip transistor control unit operable to pulse drive the clip transistor by temporarily bringing the clip transistor into conduction, where a pulse voltage is applied to a gate of the clip transistor when the circuit of the subsequent stage inputs the first brightness information or the second brightness information.

16. The imaging device of claim 2, further comprising:
a sampling transistor that is connected in series between the first output line and the clamp capacitance; and
a sampling transistor control unit operable to bring the sampling transistor out of conduction in a vertical blanking period during which neither the first brightness information nor the second brightness information is output from the imaging unit.

17. The imaging device of claim 2,
wherein each unit cell includes:
an amplifier transistor that is connected in series between an amplifier terminal for supplying a reference voltage and the first output line, and when a voltage signal converted by a charge detecting unit is applied to a gate thereof, the voltage signal is amplified and the amplified voltage signal is output to the first output line; and
a select transistor that is connected in series between the amplifier terminal and the amplifier transistor or between the amplifier transistor and the first output line, and
the imaging device further comprises:
a load transistor operable to read the output voltage via the amplifier transistor and the select transistor by loading the first output line when the load transistor is in conduction; and
a control unit operable to
(a) bring a select transistor included in one or more of the unit cells into conduction before bringing the load transistor into conduction,
(b) bring the load transistor out of conduction before bringing select transistors included in all the unit cells out of conduction, and
(c) bring the load transistor out of conduction during a vertical blanking period during which neither the first brightness information nor the second brightness information is output from any of the unit cells.

18. An imaging method for use in an imaging device that outputs brightness information according to an amount of incident light, the imaging device including:
an imaging area that (a) is formed by a plurality of unit cells arranged one dimensionally or two-dimensionally, each unit cell (i) including a photoelectric conversion part that generates a first output voltage in a reset state and a second output voltage according to an amount of incident light and (ii) generating a reset voltage corresponding to the first output voltage and a read voltage corresponding to the second output voltage, and (b) outputs the reset voltage and the read voltage of each unit cell as signals in units of columns;
a signal processing unit that (a) is formed by connecting same circuits corresponding in one-to-one to the columns, (b) processes the signals output in units of columns from the imaging area, and (c) sequentially outputs the processed signals;
an output unit operable to (a) subject the processed signals, which have been output by the signal processing unit, to necessary conversion, and (b) output the processed signals that have been subjected to the necessary conversion;
a first output line that is connected to the imaging area and receives the reset voltage and the read voltage output from each unit cell;
a second output line that outputs first brightness information or second brightness information from the signal processing unit to the output unit;
a clamp capacitance that is connected in series between the first output line and the second output line; and
a bypass transistor that is connected in parallel with the clamp capacitance, and brings the first output line and the second output line out of conduction not to bypass the clamp capacitance in a first case where a voltage applied between terminals of the clamp capacitance is in the predetermined range, and brings the first output line and the second output line into conduction to bypass the clamp capacitance in a second case where the voltage applied between the terminals is not in the predetermined range,
the imaging method comprising:
a judgment step of judging, in relation to each unit cell, whether the read voltage is in a predetermined range;
a first output step in which the signal processing unit outputs the first brightness information indicating a difference between the reset voltage and the read voltage when normal light is incident to the imaging device and the read voltage is judged to be in the predetermined range; and a second output step in which the signal processing unit replaces the first brightness information with the second brightness information indicating higher brightness than the first brightness information and then outputs the second brightness information when strong light is incident to the imaging device and the read voltage is judged not to be in the predetermined range.

19. An imaging device that outputs brightness information according to an amount of incident light, comprising:

an imaging unit that includes a plurality of unit cells arranged one dimensionally or two-dimensionally, each unit cell including a photoelectric conversion part that generates a first output voltage in a reset state and a second output voltage according to an amount of incident light, and each unit cell generating a reset voltage that corresponds to the first output voltage and a read voltage that corresponds to the second output voltage;

a signal processing unit that is formed by connecting same circuits corresponding in one-to-one to the columns, processes the signals output in units of columns from the imaging unit, and sequentially outputs the processed signals, wherein in relation to each unit cell, the signal processing unit outputs first brightness information indicating a difference between the reset voltage and the read voltage when normal light is incident to the imaging device and the read voltage is in a predetermined range, and replaces the first brightness information with second brightness information indicating higher brightness than the first brightness information and then outputs the second brightness information when strong light is incident to the imaging device and the read voltage is not in the predetermined range;

an output unit operable to subject the processed signals, which have been output by the signal processing unit, to necessary conversion, and output the processed signals that have been subjected to the necessary conversion;

a signal output line that is connected to the imaging unit and receives the reset voltage and the read voltage; and a bypass transistor operable to bring the signal output line out of conduction when the read voltage is in the predetermined range, and bring the signal output line into conduction when the read voltage is not in the predetermined range.

20. An imaging method for use in an imaging device that outputs brightness information according to an amount of incident light, the imaging device including:

an imaging area that is formed by a plurality of unit cells arranged one dimensionally or two-dimensionally, each unit cell including a photoelectric conversion part that generates a first output voltage in a reset state and a second output voltage according to an amount of incident light and generating a reset voltage corresponding to the first output voltage and a read voltage corresponding to the second output voltage;

a signal processing unit that is formed by connecting same circuits corresponding in one-to-one to the columns, processes the signals output in units of columns from the imaging area, and sequentially outputs the processed signals;

an output unit operable to subject the processed signals, which have been output by the signal processing unit, to necessary conversion, and output the processed signals that have been subjected to the necessary conversion;

a signal output line that is connected to the imaging area and receives the reset voltage and the read voltage; and a bypass transistor, the imaging method comprising:

a judgment step of judging, in relation to each unit cell, whether the read voltage is in a predetermined range;

a first output step in which the bypass transistor brings the signal output line out of conduction, causing the signal processing unit to output first brightness information indicating a difference between the reset voltage and the read voltage, when normal light is incident to the imaging device and the read voltage is judged to be in the predetermined range; and a second output step in which the bypass transistor brings the signal output line into conduction, causing the signal processing unit to replace the first brightness information with second brightness information indicating higher brightness than the first brightness information and to output the second brightness information, when strong light is incident to the imaging device and the read voltage is judged not to be in the predetermined range.

* * * * *